US007196709B2

(12) United States Patent
Kurokawa et al.

(10) Patent No.: US 7,196,709 B2
(45) Date of Patent: Mar. 27, 2007

(54) DISPLAY DEVICE AND DISPLAY SYSTEM USING THE SAME

(75) Inventors: Yoshiyuki Kurokawa, Kanagawa (JP); Takayuki Ikeda, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 363 days.

(21) Appl. No.: 10/299,796

(22) Filed: Nov. 20, 2002

(65) Prior Publication Data

US 2003/0103025 A1 Jun. 5, 2003

(30) Foreign Application Priority Data

Nov. 30, 2001 (JP) ...................................... 2001-366774

(51) Int. Cl.
*G06F 13/00* (2006.01)

(52) U.S. Cl. ........................ 345/536; 345/537; 345/538

(58) Field of Classification Search ................. 345/530, 345/536–538, 554; 711/100
See application file for complete search history.

(56) References Cited

U.S. PATENT DOCUMENTS 5,854,628 A * 12/1998 Nakagawa .................. 345/803
6,545,708 B1 * 4/2003 Tamayama et al. ...... 348/211.8
6,564,237 B2 * 5/2003 Ohashi et al. ............. 708/490
2002/0018029 A1 2/2002 Koyama
2002/0021274 A1 2/2002 Koyama et al.
2002/0024054 A1 2/2002 Koyama et al.
2002/0024485 A1 2/2002 Koyama
2002/0036604 A1 3/2002 Yamazaki et al.
2002/0039087 A1 4/2002 Inukai
2002/0113763 A1 8/2002 Koyama
2002/0130828 A1 9/2002 Yamazaki et al.

* cited by examiner

*Primary Examiner*—Matthew C. Bella
*Assistant Examiner*—Mackly Monestime
(74) *Attorney, Agent, or Firm*—Fish & Richardson P.C.

(57) ABSTRACT

Provided are a display device with low power consumption which enables reduction of an operation processing amount of a GPU and which does not require a storage device for storing image data corresponding to one screen, and a display system using the display device. The display device is constituted by pixels each including storage circuits, an operation processing circuit, and a display processing circuit and circuits each having a function of storing image data in arbitrary storage circuits. The display system is constituted by the display device and an image processing device including the GPU. Image data is formed for each structural component through operation processing in the GPU in the display system. The formed image data is stored in the corresponding storage circuit for each pixel. The stored image data is subjected to composition processing by the operation processing circuit for each pixel. Then, the image data is converted into an image signal in the display processing circuit.

60 Claims, 20 Drawing Sheets

DISPLAY DEVICE AND DISPLAY SYSTEM USING THE SAME

BACKGROUND OF THE INVENTION

1. Field of the Invention

The present invention relates to a display device and a display system using the same, and more particularly, to a display device which enables a high-definition and multi-gradation image display with low power consumption and a display system using the same.

2. Description of the Related Art

In recent years, a technique has been progressing rapidly in which a polycrystalline silicon thin film is formed on a substrate having an insulating surface, such as a glass substrate or a plastic substrate. The research and development has been actively made on a display device in which a TFT (thin film transistor), which is formed by using the polycrystalline silicon thin film as its active layer, is provided as a switching element in a pixel portion and an active matrix display device in which a circuit for driving pixels is formed in the periphery of a pixel portion.

The largest advantages of the above display device are generally thinness, lightness in weight, and low power consumption. By making use of the advantages, the display device is used as a display portion of a portable information processing device such as a notebook computer or a display portion of a portable small game player.

In the personal computer or the small game player, a display system is often mounted with an image processing device besides the display device. Here, the display system indicates a system having a function of conducting processing of receiving a result of operation processing performed in a central processing unit (hereinafter referred to as CPU) and displaying an image in a display portion. Further, the image processing device indicates a device which receives the result of operation performed in the CPU and forms image data to be sent to the display device in the display system. Further, the display device indicates a device that displays the image data formed in the image processing device as an image in the display portion. The display portion indicates a region which is comprised of a plurality of pixels and in which an image is displayed.

In order to perform a high-speed display of a large amount of image data, the image processing device is often constituted by an operation processing device dedicated for image processing (hereinafter referred to as GPU: graphic processing unit), a video random access memory (hereinafter referred to as VRAM) which is a storage device for storing image data, a display processing device, and the like.

Here, the GPU indicates a dedicated circuit that is specialized in a function of conducting operation processing for forming image data, or a circuit partly including a circuit having a function of conducting operation processing for forming image data. Therefore, in the case where part or all of the operation processing for forming image data is performed in the CPU, the CPU includes the GPU. Further, the image data indicates information on color and gradation of a display image, and indicates an electric signal of a type that can be stored in the storage device. The VRAM is stored with image data for one screen. Further, the display processing device is comprised by a circuit having a function of forming an image signal that is sent to the display device from the image data. The image signal indicates an electric signal for varying gradation of the display portion in the display device. For example, in the case of a liquid crystal display device, the image signal corresponds to a voltage signal applied to a pixel electrode.

FIG. 2A is a block structural diagram of a first conventional example, and FIG. 2B is a block structural diagram of a second conventional example. In FIG. 2A, a display system 200 is constituted by an image processing device 202, a display device 203 and a display controller 204, and exchanges data and a control signal with a CPU 201. The image processing device 202 is constituted by a GPU 205, a VRAM 206, and a display processing circuit 207. On the other hand, in FIG. 2B, a display system 210 is constituted by an image processing device 212, a display device 213, and a display controller 214, and exchanges data and a control signal with a CPU 211. The image processing device 212 is constituted by a GPU 215, a GPU 216, a VRAM 217, a VRAM 218, and a display processing circuit 219. Dual port RAMs, in which write can be conducted with one port while read can be conducted with another port, are often used as the VRAMs 206, 217 and 218.

Hereinafter, the operation of the display system will be described as to a case of displaying an image in which structural components constituting the image (hereinafter referred to as image structural component) are a character 301 and a background 302 and in which the character 301 moves about, as shown in FIG. 3.

First, the first conventional example shown in FIG. 2A is described. The CPU 201 performs data operations on the position and direction of the character 301, the position of the background 302, and the like. The operation results are transmitted to the display system 200 to be received by the GPU 205. The GPU 205 conducts operation processing for converting the operation results of the CPU 201 into image data. For example, the GPU 205 conducts operation processing on the formation of the image data of the character 301, the formation of the image data of the background 302, overlapping of the image data, and the like to thereby convert color and gradation of a display image into data expressed by binary numbers. The image data is stored into the VRAM 206, and is periodically read out in accordance with display timing. The read image data is converted into an image signal in the display processing circuit 207, and then is transmitted to the display device 203. Here, in the case of, for example, a liquid crystal display device, the display processing circuit 207 corresponds to a circuit for conducting conversion to a voltage signal, such as a DAC (DA converter), and the image signal corresponds to analog data in accordance with the gradation of the pixel of the display portion. A display timing control of the display device 203 is conducted by the display controller 204.

Next, the second conventional example shown in FIG. 2B is explained. The CPU 211 performs data operations on the position and direction of the character 301, the position of the background 302, and the like. The operation results are sent to the display system 210, and the GPU 215 and the GPU 216 respectively receive the results necessary for performing operations. In this conventional example, the GPU 215 receives the operation results on the position and direction of the character 301 among the operation results in the CPU. Further, the GPU 216 receives the operation results on the position of the background 302 and the like among the operation results in the CPU. Subsequently, the GPU 215 forms image data of the character 301. The formed image data of the character is stored into the VRAM 217. Further, the GPU 216 forms image data of the background 302. The formed image data of the background is stored into the VRAM 218. Then, the GPU 215 and the GPU 216 synchronize each other and read out the character image data stored in the VRAM 217 and the background image data stored in the VRAM 218, and composition of the image data is conducted in the GPU 216. The composed whole image data is converted into an image signal in accordance with display timing in the display processing circuit 219, and then transmitted to the display device 213. A display timing control of the display device 213 is conducted by the display controller 214.

In the first conventional example shown in FIG. 2A, the image data of the character and the background is formed in the GPU 205, and thus, the operation amount is enormous in the case where the image data of the character and the background is frequently updated. On the other hand, the VRAM 206 is required to have a storage capacitance enough to store image data corresponding to one screen. Further, the image data corresponding to one screen needs to be read from the VRAM 206 every time re-imaging (hereinafter referred to as image refresh) of a display image for each frame is conducted in the display device. Therefore, read is conducted even in the case where the displayed image is not updated at all, and thus, the power consumption in the VRAM 206 is large. Accordingly, when a high-definition and multi-gradation image display is performed, the operation amount of the GPU 205 further increases, and the storage capacitance of the VRAM 206 further increases, which leads to a further increase of power consumption at the time of image refresh.

On the other hand, in the second conventional example shown in FIG. 2B, the formation of the character image data and the formation of the background image data are separately conducted by the GPU 215 and the GPU 216. Therefore, even if the image data of the character and the background is frequently updated, the operation processing amount in each of the GPUs is smaller than that of the GPU 205 in the first conventional example. However, the fact remains that two VRAMs are required, that is, a large amount of storage capacitance is required. Further, overlapping processing of the character image data and the background image data is conducted every time the image refresh is conducted in the display device. Therefore, the image data also needs to be periodically read from the VRAM 217 and the VRAM 218. That is, read is conducted even in the case where the character image data or the background image data is not updated at all, and thus, the power consumption is large. Accordingly, when a high-definition and multi-gradation image display is performed, the power consumption in the VRAM 217 and in the VRAM 218 increases.

As described above, the structures of the conventional display systems have the following problems in performing a high-definition and multi-gradation image display at a high imaging speed in the display device. That is, there are given a problem (1) in that the GPU is required to have a considerable operation ability, and thus, the chip size of the GPU is increased, and a problem (2) in that the VRAM is required to have a large amount of storage capacitance, and thus, the chip size of the VRAM is increased. These problems lead to an increase of a mounting area or mounting volume of the image processing device. Further, there is given a problem (3) in that a large amount of image data needs to be read from the VRAM at the time of image refresh, which leads to an increase of power consumption.

SUMMARY OF THE INVENTION

The present invention has been made in view of the above problems, and therefore has an object to provide a display device which (1) enables reduction of an operation processing amount of a GPU, (2) does not need a storage device for storing image data corresponding to one screen on the outside of the display device, and (3) enables a display without periodical read of data from a VRAM at the time of image refresh, and a display system using the display device.

According to the present invention, the display device is constituted by pixels each including storage circuits, an operation processing circuit, and a display processing circuit and circuits each having a function of storing image data in arbitrary storage circuits. The display system is constituted by the display device with the above structure and an image processing device including a GPU. In the display system, image data is formed for each structural component constituting an image through operation processing in the GPU. The formed image data is stored in the corresponding storage circuit for each pixel. The stored image data for each image structural component is selected to be output or not selected depending on whether the image data corresponds to predetermined image data in the operation processing circuit for each pixel. Then, the image data is converted into an image signal in the display processing circuit.

The above display system using the above display device is used, whereby part of operation processing, which has been conducted in the GPU in the prior art, can be conducted in the pixel with the rest of the processing being conducted in the GPU. Thus, the operation processing amount of the GPU can be reduced in the display system according to the present invention. Further, the display system according to the present invention does not need to be mounted with the VRAM. Thus, the number of parts constituting the display system can be reduced, and therefore can be downsized and reduced in weight. Furthermore, image refresh can be performed without performing periodical read of the image data corresponding to one screen from the VRAM. Thus, in the case where a static image is displayed, or in the case where only part of the image data is changed, power consumption can be greatly reduced.

A structure according to the present invention disclosed in this specification relates to a display device, including a plurality of pixels each including a first storage circuit, a second storage circuit, an operation processing circuit, and a display processing circuit, characterized in that: the first storage circuit stores first image data and outputs the data to the operation processing circuit; the second storage circuit stores second image data and outputs the data to the operation processing circuit; the operation processing circuit outputs the first image data to the display processing circuit in the case where the second image data corresponds to predetermined image data, and outputs the second image data to the display processing circuit in the case where the second image data does not correspond to the predetermined image data; and the display processing circuit forms an image signal from the first image data or the second image data which is output from the operation processing circuit.

Another structure according to the present invention relates to a display device, including a plurality of pixels each including a first storage circuit, a second storage circuit, an operation processing circuit, and a display processing circuit, characterized in that: the first storage circuit stores first image data and outputs the data to the operation processing circuit; the second storage circuit stores second image data and outputs the data to the operation processing circuit; the operation processing circuit outputs the first image data to the display processing circuit in the case where the second image data corresponds to predetermined image data, and outputs the second image data to the display processing circuit in the case where the second image data does not correspond to the predetermined image data; the display processing circuit forms an image signal from the first image data or the second image data which is output from the operation processing circuit; the first storage circuit has means for storing the first image data corresponding to one frame; and the second storage circuit has means for storing the second image data corresponding to one frame.

Another structure according to the present invention relates to a display device, including a plurality of pixels each including a first storage circuit, a second storage circuit, an operation processing circuit, and a display processing circuit, characterized in that: the first storage circuit stores first image data and outputs the data to the operation processing circuit; the second storage circuit stores second image data and outputs the data to the operation processing circuit; the operation processing circuit outputs the first image data to the display processing circuit in the case where the second image data corresponds to predetermined image data, and outputs the second image data to the display processing circuit in the case where the second image data does not correspond to the predetermined image data; and the display processing circuit forms an image signal from the first image data or the second image data, which is output from the operation processing circuit, through D/A conversion.

Another structure according to the present invention relates to a display device, including a plurality of pixels each including a first storage circuit, a second storage circuit, an operation processing circuit, and a display processing circuit, characterized in that: the first storage circuit stores first image data and outputs the data to the operation processing circuit; the second storage circuit stores second image data and outputs the data to the operation processing circuit; the operation processing circuit outputs the first image data to the display processing circuit in the case where the second image data corresponds to predetermined image data, and outputs the second image data to the display processing circuit in the case where the second image data does not correspond to the predetermined image data; the display processing circuit forms an image signal from the first image data or the second image data, which is output from the operation processing circuit, through D/A conversion; the first storage circuit has means for storing the first image data corresponding to one frame; and the second storage circuit has means for storing the second image data corresponding to one frame.

In any of the above structures, at least one of the first image data and the second image data may be image data of 1 bit.

In any of the above structures, at least one of the first image data and the second image data may be image data of 2 bits or more.

In any of the above structures, means for changing a gradation of a pixel in accordance with the image signal is desirably provided.

In any of the above structures, means for sequentially driving the storage circuits for each bit is desirably provided.

In any of the above structures, means for sequentially inputting the image data to the storage circuits for each bit is desirably provided.

In any of the above structures, the storage circuits each may be comprised of a static random access memory (SRAM).

In any of the above structures, the storage circuits each may be comprised of a dynamic random access memory (DRAM).

In any of the above structures, it is desirable that the storage circuits, the operation processing circuit, and the display processing circuit are structured by thin film transistors, each including an active layer formed of a semiconductor thin film, which are formed on one substrate selected from the group consisting of a single crystalline semiconductor substrate, a quartz substrate, a glass substrate, a plastic substrate, a stainless substrate, and an SOI substrate.

In any of the above structures, a circuit having a function of sequentially driving the storage circuits for each bit is desirably formed on the same substrate as a pixel portion.

In any of the above structures, a circuit having a function of sequentially inputting the image data to the storage circuits for each bit is desirably formed on the same substrate as the pixel portion.

In any of the above structures, the semiconductor thin film is desirably formed by a crystallization method using a continuous oscillation laser.

It is effective that the display device with any of the above structures is incorporated into an electronic device.

A display system may be constituted by the display device with any of the above structures and an operation processing device dedicated for image processing.

It is effective that the display system with the above structure is incorporated into an electronic device.

DETAILED DESCRIPTION OF THE PREFERRED EMBODIMENTS

In an embodiment mode, description will be made of a typical structure of a display device according to the present invention and a display system using the display device according to the present invention.

Figure 1A:
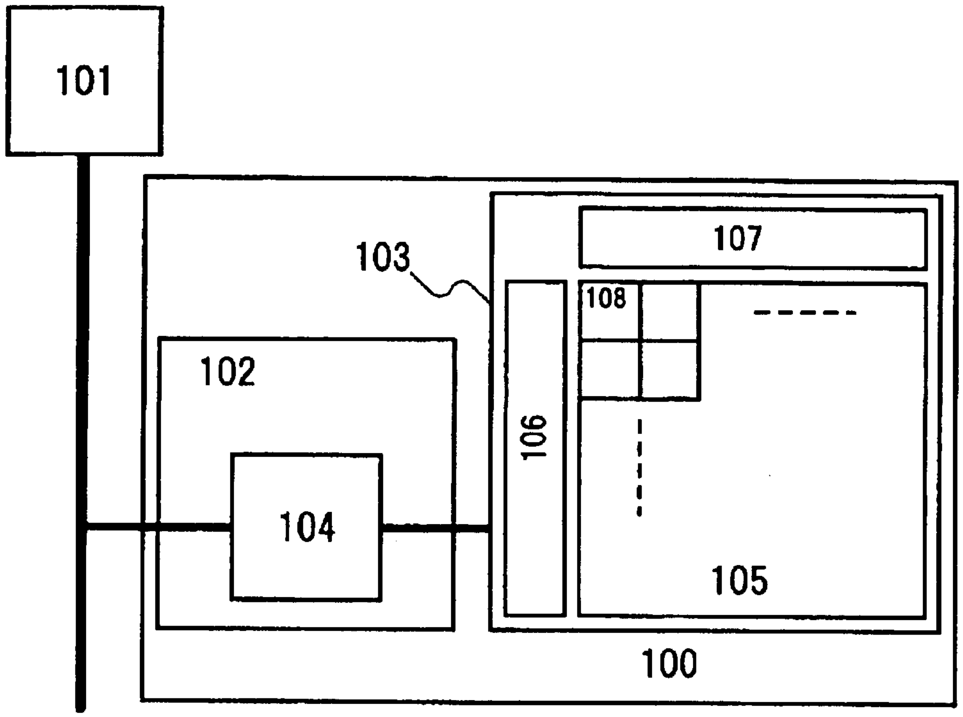
FIGS. 1A and 1B are block diagrams for explaining the structures of a display device and a display system using the display device according to the present invention.
Figure 1B:
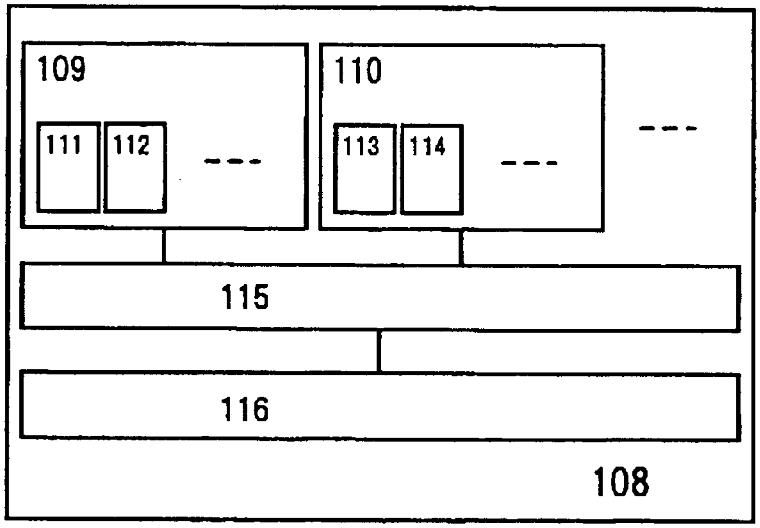
Figure 2A:
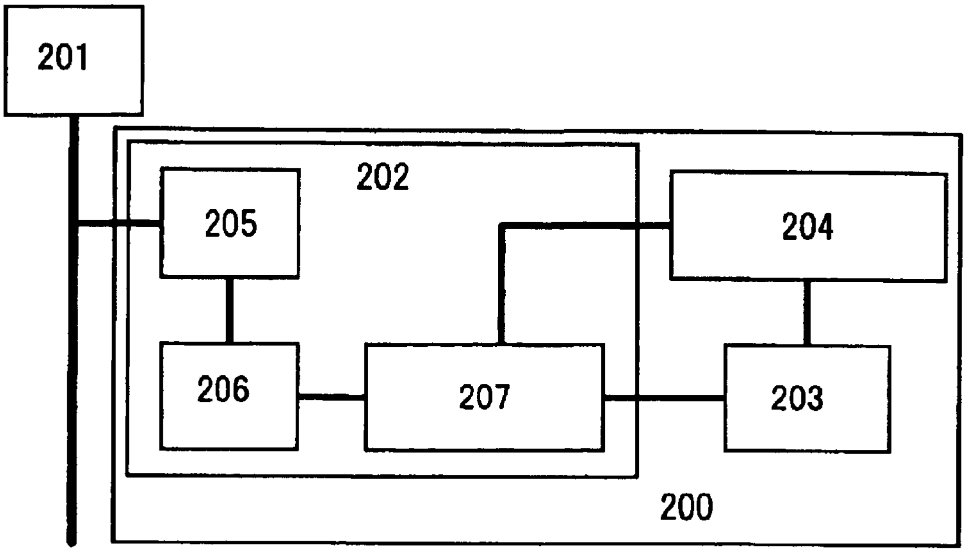
FIGS. 2A and 2B are block diagrams for explaining the structures of a conventional display device and a conventional display system using the display device.
Figure 2B:
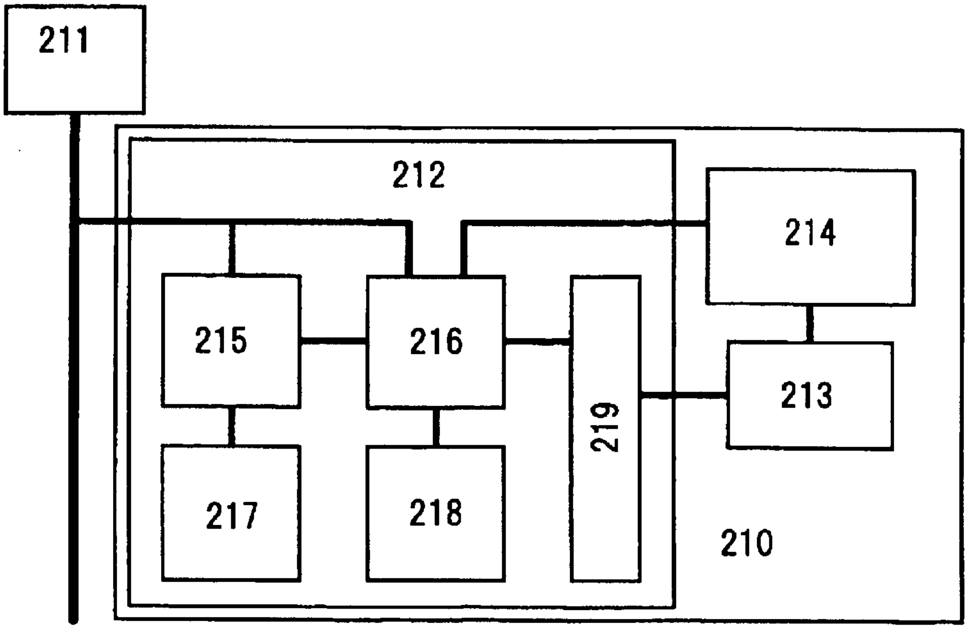

Hereinafter, the display device and the display system using the display device are described with reference to the block diagram shown in FIGS. 1A and 1B. FIG. 1A shows a block structure of the display device and the display system using the display device in accordance with the embodiment mode of the present invention. A display system 100 is constituted by an image processing device 102 and a display device 103, and exchanges data and a control signal with a CPU 101. The image processing device 102 is comprised of a GPU 104. Further, the display device 103 includes a pixel portion 105, a row decoder 106, and a column decoder 107. The pixel portion 105 comprises a plurality of pixels 108. Further, FIG. 1B is a detailed block diagram of the pixel 108, and the pixel 108 includes pixel storage circuits 109 and 110, a pixel operation processing circuit 115, and a pixel display processing circuit 116. The pixel storage circuit 109 (110) includes storage elements 111 and 112 (113 and 114). Note that three or more pixel storage circuits may be included in one pixel.

Further, differently from the conventional display system, the display system in this embodiment mode does not need a storage device for storing image data corresponding to one screen. In addition, a display controller is not necessarily required.

In the pixel portion 105, the pixels 108 are arranged in matrix. The row decoder 106 and the column decoder 107 can select specific pixel storage circuits. The column decoder 107 or the row decoder 106 includes an electric circuit having means for writing image data into the selected pixel storage circuits 109 and 110. The pixel storage circuits 109 and 110 are comprised of the 1, 2 or more-bit storage elements 111 to 114. The pixel storage circuits 109 and 110 are each comprised of multi-bit storage elements, thereby being capable of performing, for example, a multi-gradation display. In this case, the row decoder 106 and the column decoder 107 select the specific bit storage elements 111 to 114 of the specific pixel, and the column decoder 107 may include an electric circuit having means for writing image data into the selected storage elements 111 to 114. The pixel operation processing circuit 115 is comprised of a logic circuit for conducting composition of image data stored in the respective pixel storage circuits. The pixel display processing circuit 116 has a function of converting image data into an image signal.

Figure 3:
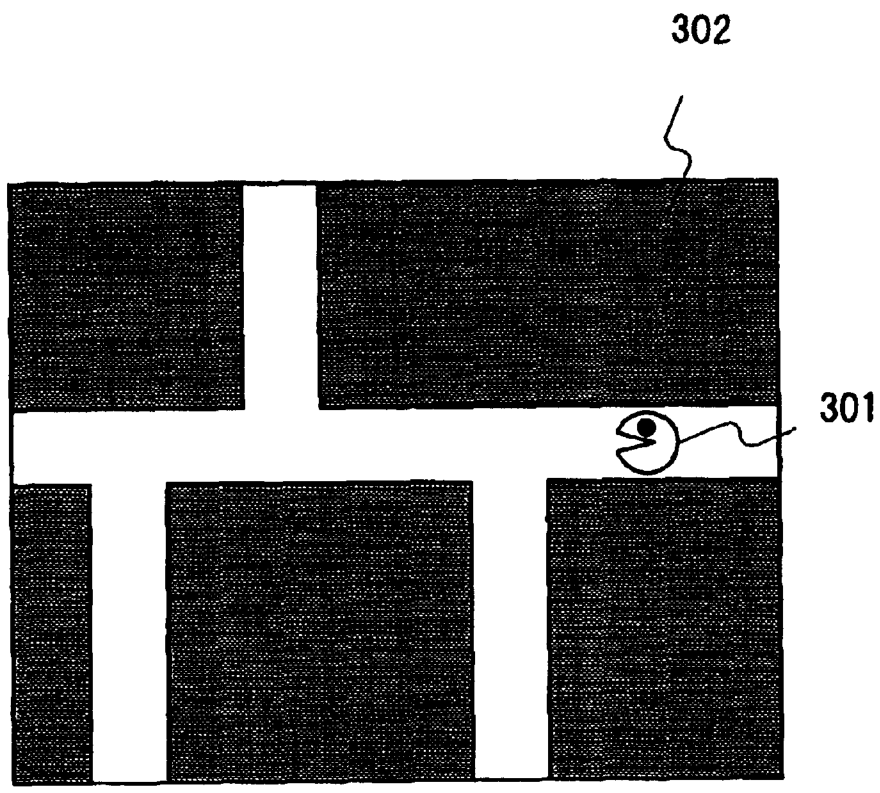
FIG. 3 shows an example of a display image.

Next, in order to explain a specific driving method of the display device according to the present invention, there will be described a display method of an image shown in FIG. 3, in which a character 301 moves about, the image being constituted by the character 301 and a background 302.

First, the CPU 101 performs data operations on the center position, direction, and the like of the character 301 and operations on scroll of the background 302 and the like. The operation results in the CPU 101 are converted into image data by operation processing in the GPU 104. For example, the image data of the character 301 is formed from the data of the direction of the character 301, and the image data is converted into the data in which color and gradation per pixel are expressed by binary numbers. In this embodiment mode, the image data of the character 301 and the image data of the background 302 are stored into the pixel storage circuits 109 and 110, respectively.

Next, in the pixel operation processing circuit 115, there is performed overlapping of the image data of the character 301 stored in the pixel storage circuit 109 and the image data of the background 302 stored in the pixel storage circuit 110. Here, the overlapping means that the image data of the background 302 is output in the case where the image data of the character 301 coincides with predetermined image data, and the image data of the character 301 is output in the case where the image data of the character 301 does not coincide with the predetermined image data. The output image data is then converted into an image signal by the pixel display processing circuit 116 in each pixel. For example, in the case of a liquid crystal display device, the image data is converted into a value of a voltage applied to an electrode of a liquid crystal element. The pixel display processing circuit 116 is an electric circuit for converting image data into an image signal with analog gradation, such as a DAC.

This embodiment mode has a characteristic that the display system is structured by using the display device having in each pixel the circuit having a function of conducting part of operation processing that has been conducted in the GPU in the prior art, or the storage circuit for storing image data necessary for a display corresponding to one screen. The use of the above display device enables reduction of an operation processing amount in the GPU. Further, the number of parts necessary for the image processing device can be reduced, and thus, the display system can be downsized and reduced in weight. Further, in the case where a static image is displayed or in the case where only a part of a display image is changed, power consumption can be remarkably reduced. Accordingly, a display device appropriate for a high-definition and large-size image display is provided.

The display device may include a circuit having means for simultaneously selecting a plurality of pixels and storing image data into pixel storage circuits in the selected pixels. For example, a decoder circuit capable of simultaneously selecting eight pixels for each row and a circuit for writing data into the pixel storage circuits in the eight pixels may be included. Further, in the case of performing a color display, a circuit having a means for selecting one to three pixels of R (red), G (green) and B (blue) may be included. With the above structure, a time for writing data into the pixel storage circuits can be shortened, which enables a higher definition and larger size image display.

In the display device in this embodiment mode, the image processing device and the display device may be mounted on the same substrate or mounted on separate substrates. In the case where the image processing device and the display device are mounted on the same substrate, the GPU may be structured using TFTs. This structure can simplify wirings, which leads to lower power consumption.

This embodiment mode can be used for a liquid crystal display device, a display device using a self-light emitting element, and a driving method thereof.

Embodiment 1

In this embodiment, as an example of the display device with the structure shown in the embodiment mode, there is given a liquid crystal display device including pixels each of which is constituted by two pixel storage circuits each of which is comprised of 2-bit storage elements, a pixel operation processing circuit, and a pixel display processing circuit comprised of a DAC. Hereinafter, description will be made of a circuit structure of a pixel of the liquid crystal display device and a display method for each pixel in accordance with this embodiment. Note that a pixel for a monochromatic display is explained in this embodiment, but in the case of performing a color display, the same structure as in this embodiment may be adopted for each of RGB.

Figure 4:
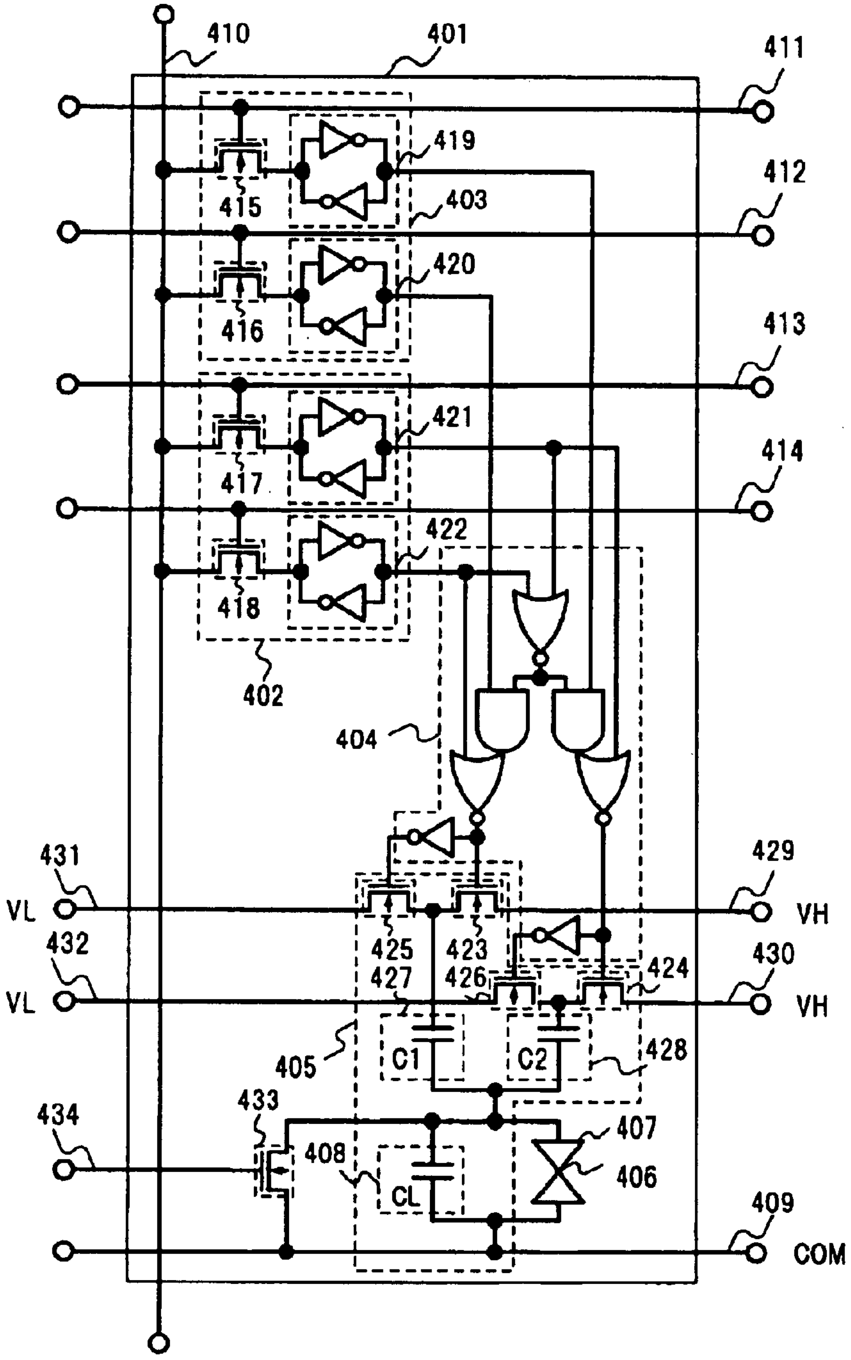
FIG. 4 is a circuit diagram of a pixel in accordance with Embodiment 1.

FIG. 4 is a circuit diagram of the pixel of the liquid crystal display device in this embodiment. In FIG. 4, there are shown a pixel 401, pixel storage circuits 402 and 403, a pixel operation processing circuit 404, and a pixel display processing circuit 405. A liquid crystal element 406 is sandwiched by a pixel electrode 407 and a common potential line 409. A liquid crystal capacitor element 408 is shown as a capacitor element with a capacitance CL which includes together a capacitor component of the liquid crystal element 406 and a storage capacitor provided for holding an electric charge.

A source wiring 410 intersects with gate wirings 411 to 414, and selecting transistors 415 to 418 are arranged at the respective intersection points. Gate electrodes of the selecting transistors 415 to 418 are electrically connected with the gate wirings 411 to 414, and source electrodes or drain electrodes thereof are electrically connected with the source wiring 410 while the other electrodes are electrically connected with one group of electrodes of storage elements 419 to 422. The other group of electrodes of the storage elements 419 to 422 is electrically connected with respective inputs of the pixel operation processing circuit 404. In this embodiment, the storage elements 419 to 422 each comprise a circuit in which two inverter circuits are arranged in a loop shape. The selecting transistors 417 and 418 and the storage elements 421 and 422 constitute the pixel storage circuit 402, and the selecting transistors 415 and 416 and the storage elements 419 and 420 constitute the pixel storage circuit 403.

This embodiment shows an example in which the pixel operation processing circuit 404 is constituted by one NOR circuit, two AND-NOR circuits, and two inverter circuits.

The pixel display processing circuit 405 is a capacitance division type DAC which is constituted by high potential selecting transistors 423 and 424, low potential selecting transistors 425 and 426, capacitor elements 427 and 428, high potential lines 429 and 430, low potential lines 431 and 432, a reset transistor 433, a reset signal line 434, the liquid crystal capacitor element 408, and the common potential line 409.

Here, in the pixel display processing circuit 405, reference symbol C1 denotes the capacitance of the capacitor element 427, reference symbol C2 denotes the capacitance of the capacitor element 428, reference symbol VH denotes the potential of each of the high potential lines 429 and 430, reference symbol VL denotes the potential of each of the low potential lines 431 and 432, and reference symbol COM denotes the potential of the common potential line 409. Further, the potential selected by making one of the high potential selecting transistor 423 and the low potential selecting transistor 425 conductive (VH or VL) is denoted by reference symbol V1, and the potential selected by making one of the high potential selecting transistor 424 and the low potential selecting transistor 426 conductive (VH or VL) is denoted by reference symbol V2. At this time, the potential VP applied to the pixel electrode 407 equals (C1·V1+C2·V2+CL·COM)/(C1+C2+CL). In this embodiment, C1:C2:CL=2:1:1 and COM=0 V are adopted. Therefore, VP=(2V1+V2)/4 is hereinafter satisfied.

Next, there is described a method of displaying an image with the display device in this embodiment. A display of an image in which the character 301 moves about is described with the image constituted by the character 301 and the background 302, which is shown in FIG. 3. Hereinafter, "H" corresponds to an applied potential of 5 V, and "L" corresponds to an applied potential of 0 V. Further, a so-called normally white mode is adopted in which a light transmittance in the case where the potential applied to the liquid crystal element 406 is 0 V is maximum, with the result that, as the absolute value of the applied voltage becomes larger, the light transmittance is reduced. Further, the upper bit and the lower bit of the image data of the character 301 are respectively stored in the storage elements 422 and 421, and the upper bit and the lower bit of the image data of the background 302 are respectively stored in the storage elements 420 and 419.

First, the reset signal line 434 is set at "H" to make the reset transistor 433 conductive. Thus, the potential of the pixel electrode 407 becomes equal to that of the common potential line 409 (0 V), and therefore, the following display after rewrite of the image data is easily enabled.

Next, as to each of the character 301 and the background 302, the image data formed by the operation processing in the GPU is stored as the data of 2 bits (4 gradations) into the corresponding storage elements 419 to 422 of the pixel storage circuits 402 and 403. Here, for example, in the case where the upper bit of the image data of the character 301 is "1", when the electric signal of "H" is imparted to the source line 410, and a potential of 8 V is applied to the gate wiring 414, "1" is stored in the storage element 422. Further, when the electric signal of "L" is imparted to the source wiring 410, and the potential of 8 V is applied to the gate wiring 411, "0" is stored in the storage element 419.

Note that, as to the selection method of the gate wirings 411 to 414, for example, a signal for designating a row of pixels to which image data should be stored (row address signal) may be formed in the GPU, and a signal for selecting any of the gate wirings 411 to 414 may be formed from the row address signal in a decoder circuit.

In the pixel operation processing circuit 404, a signal for selecting one of the high potential selecting transistor 423 and the low potential selecting transistor 425 and one of the high potential selecting transistor 424 and the low potential selecting transistor 426 is formed in accordance with the image data stored in the storage elements 419 to 422. In this embodiment, the composition of the image data of the character 301 and the image data of the background 302 is conducted. Here, predetermined image data is indicated by "11". That is, in the case where the image data of the character 301 corresponds to "11", the image data of the background 302 is selected, and in other cases, the image data of the character 301 is selected. The image data after composition is as shown in Table 1. Here, in the case where the upper bit of the selection signal is "1" ("0"), the high potential selecting transistor 423 (low potential selecting transistor 425) is made conductive. Also, the lower bit of the selection signal is "1" ("0"), the high potential selecting transistor 424 (low potential selecting transistor 426) is made conductive.

Then, the reset signal line 434 is set at "L" to make the reset transistor 433 non-conductive. Further, the potential VH (for example, 3 V) is applied to the high potential lines 429 and 430, and the potential LH (for example, 1 V) is applied to the low potential lines 431 and 432.

The potential of one of the high potential line 429 and the low potential line 431 and the potential of one of the high potential line 430 and the low potential line 432 are respectively applied to the capacitor elements 427 and 428. Thus, the voltage applied to the pixel electrode 407 is determined by the capacitor DAC in the pixel display processing circuit 405 as shown in Table 1. At the same time, the light transmittance of the liquid crystal element 406 can be changed stepwise.

TABLE 1

| Character | | Background | | Composition image | | |
|---|---|---|---|---|---|---|
| Upper bit | Lower bit | Upper bit | Lower bit | Lower bit | Upper bit | Pixel electrode voltage [V] |
| 0 | 0 | 0 | 0 | 0 | 0 | 0.75 |
| | | 0 | 1 | | | |
| | | 1 | 0 | | | |
| | | 1 | 1 | | | |
| 0 | 1 | 0 | 0 | 0 | 1 | 1.25 |
| | | 0 | 1 | | | |
| | | 1 | 0 | | | |
| | | 1 | 1 | | | |
| 1 | 0 | 0 | 0 | 1 | 0 | 1.75 |
| | | 0 | 1 | | | |
| | | 1 | 0 | | | |
| | | 1 | 1 | | | |
| 1 | 1 | 0 | 0 | 0 | 0 | 0.75 |
| | | 0 | 1 | 0 | 1 | 1.25 |
| | | 1 | 0 | 1 | 0 | 1.75 |
| | | 1 | 1 | 1 | 1 | 2.25 |

From the results of the operation processing in the GPU, in the case where the image data is changed, the reset signal line 434 is set at "H" to make the reset transistor 433 conductive. Then, the same method as above is repeated.

Further, since burning is developed when the same potential is continuously applied to the liquid crystal element for a long time, it is preferable that the potential is periodically changed between VH and VL. For example, for each display period, VH (VL) is changed from +3 V (+1 V) to −3 V (−1 V), or is changed from −3 V (−1 V) to +3 V (+1 V). In this case, the reset signal line 434 is once set at "H" to make the reset transistor 433 conductive, and then, the reset signal line 434 is again set at "L" to make the reset transistor 433 non-conductive. Thereafter, the potential is changed between VH and VL.

Note that the operation voltages shown in this embodiment are just examples, and the present invention is not limited to the voltage values.

In this embodiment, as the display device according to the present invention, there is shown an example in which the two pixel storage circuits in the pixel are respectively comprised of 2-bit SRAMs. However, the 3 or more-bit SRAM may be used. The multi-bit SRAM enables an increase of the number of colors of an image and an image display with high definition. Further, three or more pixel storage circuits may be incorporated into the pixel. The case of displaying a more complicated image can be dealt with by incorporating a large number of pixel storage circuits. Further, the number of bits may differ among the pixel storage circuits.

Further, in this embodiment, as the display device according to the present invention, there is shown an example in which the pixel storage circuit comprises an SRAM. However, the pixel storage circuit may be comprised of another known storage element such as a DRAM. For example, when the DRAM is used, the area of the storage elements can be reduced, which easily enables a multi-bit structure. Therefore, the number of colors of a display image can be increased, and the image display with high definition can be realized. In this case, storage information is in accordance with the amount of electric charge accumulated in the capacitor element, but the accumulated electric charge is lost with time. Thus, the storage information of the storage element needs to be rewritten periodically.

Further, the capacitance division type DAC is used as the pixel display processing circuit in this embodiment, but the pixel display processing circuit may be comprised of a DAC of another known method, such as a resistance division type DAC. Moreover, the pixel display processing circuit is comprised of the DAC in this embodiment, but may be structured by another known method of converting digital data on area gradation into an image signal. Since the optimum structure varies depending on individual cases, an operator may appropriately select the structure.

Note that the structure shown in this embodiment can be applied to a display device using a self-light emitting element, for example, an OLED display device besides a liquid crystal display device.

As described above, in the display system using the display device with the structure shown in this embodiment, the part of operation processing, which has been conducted in the GPU in the prior art, can be conducted in the display device, and thus, the operation processing amount in the GPU can be reduced. Further, the number of parts necessary for the image processing device can be reduced, whereby the display system can be downsized and reduced in weight. Furthermore, in the case where a static image is displayed, or in the case where only a part of the display image is changed, it is sufficient that the very minimum amount of image data is rewritten, and thus, the power consumption can be greatly reduced. Therefore, the display device appropriate for the high-definition and large-size image display and the display system using the display device can be realized.

Embodiment 2

In this embodiment, there is taken an example of a liquid crystal display device in which the structures of a pixel operation processing circuit and of a pixel display processing circuit differ from those in Embodiment 1. Hereinafter, description will be made on a circuit structure of a pixel of the liquid crystal display device and a display method for each pixel in this embodiment. Note that a pixel for a monochromatic display is explained in this embodiment, but in the case of performing a color display, the structure of this embodiment may be adopted for each of RGB.

Figure 5:
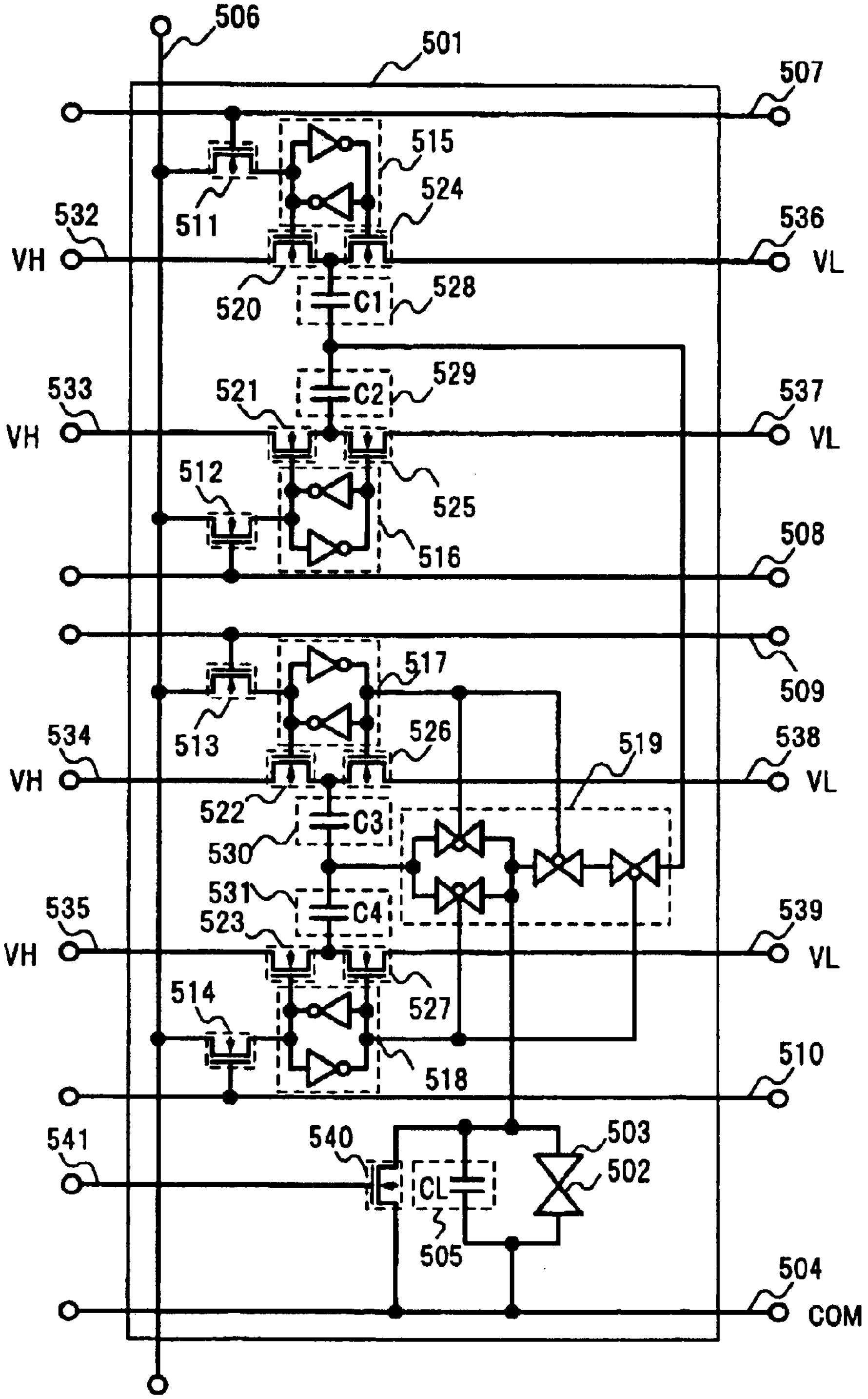
FIG. 5 is a circuit diagram of a pixel in accordance with Embodiment 2.

FIG. 5 is a circuit diagram of the pixel of the liquid crystal display device in this embodiment. In FIG. 5, there is shown a pixel 501, in which a liquid crystal element 502 is sandwiched by a pixel electrode 503 and a common potential line 504. A liquid crystal capacitor element 505 is shown as a capacitor element with a capacitance CL which includes together a capacitor component of the liquid crystal element 502 and a storage capacitor provided for holding an electric charge.

A source wiring 506 intersects with gate wirings 507 to 510, and selecting transistors 511 to 514 are arranged at the respective intersection points. Gate electrodes of the selecting transistors 511 to 514 are electrically connected with the gate wirings 507 to 510, and source electrodes or drain electrodes thereof are electrically connected with the source wiring 506 while the other electrodes are electrically connected with storage elements 515 to 518. In this embodiment, the storage elements 515 to 518 each comprise a circuit in which two inverter circuits are arranged in a loop shape. The selecting transistors 511 and 512 and the storage elements 515 and 516 constitute a first pixel storage circuit (not shown), and the selecting transistors 513 and 514 and the storage elements 517 and 518 constitute a second pixel storage circuit (not shown).

In this embodiment, a pixel operation processing circuit 519 is comprised of four analog switches.

A pixel display processing circuit (not shown) is constituted by high potential selecting transistors 520 to 523, low potential selecting transistors 524 to 527, capacitor elements 528 to 531 (capacitances C1 to C4), high potential lines 532 to 535, low potential lines 536 to 539, a reset transistor 540, a reset signal line 541, a liquid crystal capacitor element 505, and a common potential line 504. Note that, in this embodiment, C1:C2:C3:C4:CL=2:1:2:1:1 and COM=0 V are adopted.

Next, there is described a display method with the display device in this embodiment. A display of an image in which the character 301 moves about is described with the image constituted by the character 301 and the background 302, which is shown in FIG. 3. Hereinafter, "H" corresponds to an applied potential of 5 V, and "L" corresponds to an applied potential of 0 V. Further, a so-called normally white mode is adopted in which a light transmittance in the case where the potential applied to the liquid crystal element 502 is 0 V is maximum, with the result that, as the absolute value of the applied voltage becomes larger, the light transmittance is reduced. Further, the upper bit and the lower bit of the image data of the character 301 are respectively stored in the storage elements 517 and 518, and the upper bit and the lower bit of the image data of the background 302 are respectively stored in the storage elements 515 and 516.

First, the reset signal line 541 is set at "H" to make the reset transistor 540 conductive. Thus, the potential of the pixel electrode 503 becomes equal to that of the common potential line 504 (0 V), and therefore, the following display after rewrite of the image data is easily enabled.

Next, as to each of the character 301 and the background 302, the image data obtained by the operation processing in the GPU is stored as the data of 2 bits (4 gradations) into the corresponding storage elements 515 to 518. Here, for example, in the case where the upper bit of the image data of the character 301 is "1", when the electric signal of "H" is imparted to the source line 506, and a potential of 8 V is applied to the gate wiring 509, "1" is stored in the storage element 517. Also, when the electric signal of "L" is imparted to the source wiring 506, and the potential of 8 V is applied to the gate wiring 510, "0" is stored in the storage element 518.

Note that, as to the selection method of the gate wirings 507 to 510, for example, a signal for designating a row of pixels to which image data should be stored (row address signal) may be formed in the GPU, and a signal for selecting any of the gate wirings 507 to 510 may be formed from the row address signal in a decoder circuit.

Then, the reset signal line 541 is set at "L" to make the reset transistor 540 non-conductive. Further, the potential VH (for example, 3 V) is applied to the high potential lines 532 to 535, and the potential LH (for example, 1 V) is applied to the low potential lines 536 to 539.

In this embodiment, predetermined image data is denoted by "11". In the case where the image data of the character 301 corresponds to "11", the image data of the background 302 is selected, and in other cases, the image data of the character 301 is selected. The image data after composition is as shown in Table 1.

In the case where both the data stored in the storage element 517 and the data stored in the storage element 518 correspond to "1", there is structured by the pixel operation processing circuit 519 the capacitance division type DAC which is constituted by the capacitor elements 528 and 529, the liquid crystal capacitor element 505, the high potential selecting transistors 520 and 521, the low potential selecting transistors 524 and 525, the high potential lines 532 and 533, and the low potential lines 536 and 537.

Further, in the case where at least one of the data stored in the storage element 517 and the data stored in the storage element 518 corresponds to "0", there is structured by the pixel operation processing circuit 519 the capacitance division type DAC which is constituted by the capacitor elements 530 and 531, the liquid crystal capacitor element 505, the high potential selecting transistors 522 and 523, the low potential selecting transistors 526 and 527, the high potential lines 534 and 535, and the low potential lines 538 and 539.

The method of forming an image signal with a DAC is the same as the method shown in Embodiment 1, and thus, description thereof is omitted. In this embodiment as well, the potential applied to the pixel electrode 503 is determined as shown in Table 1. At the same time, the light transmittance of the liquid crystal element 502 can be changed stepwise.

From the results of the operation processing in the GPU, in the case where the image data is changed, the reset signal line 541 is set at "H" to make the reset transistor 540 conductive. Then, the same method as above is repeated.

Further, since burning is developed when the same potential is continuously applied to the liquid crystal element for a long time, it is preferable that the potential is periodically changed between VH and VL. For example, with respect to each display period, VH (VL) is changed from +3 V (+1 V) to −3 V (−1 V), or is changed from −3 V (−1 V) to +3 V (+1 V). In this case, the reset signal line 541 is once set at "H" to make the reset transistor 540 conductive, and then, the reset signal line 541 is again set at "L" to make the reset transistor 540 non-conductive. Thereafter, the potential is changed between VH and VL.

Note that the operation voltages shown in this embodiment are just examples, and the present invention is not limited to the voltage values.

In this embodiment, as the display device according to the present invention, there is shown an example in which the two pixel storage circuits in the pixel are respectively comprised of 2-bit SRAMs. However, the SRAM of 3 or more bits may be used. The multi-bit SRAM enables an increase of the number of colors of an image and an image display with high definition. Further, three or more pixel storage circuits may be incorporated into the pixel. The case of displaying a more complicated image can be dealt with by incorporating a large number of pixel storage circuits. Further, the number of bits may differ among the pixel storage circuits.

Further, in this embodiment, as the display device according to the present invention, there is shown an example in which the pixel storage circuit comprises the SRAM. However, the pixel storage circuit may be comprised of another known storage element such as a DRAM. For example, when the DRAM is used, the area of the storage elements can be reduced, which easily enables a multi-bit structure. Therefore, the number of colors of a display image can be increased, and the image display with high definition can be realized. In this case, storage information is in accordance with the amount of electric charge accumulated in the capacitor element, but the accumulated electric charge is lost with time. Thus, the storage information of the storage element needs to be rewritten periodically.

Further, the capacitance division type DAC is used as the pixel display processing circuit in this embodiment, but the pixel display processing circuit may be comprised of a DAC of another known method, such as a resistance division type DAC. Moreover, the pixel display processing circuit is comprised of the DAC in this embodiment, but may be structured by another known method of converting digital data on area gradation or the like into an image signal. Since the optimum structure varies depending on individual cases, an operator may appropriately select the structure.

Note that the structure shown in this embodiment can be applied to a display device using a self-light emitting device, for example, an OLED display device besides a liquid crystal display device.

As described above, in the display system using the display device with the structure shown in this embodiment, the part of operation processing, which has been conducted in the GPU in the prior art, can be conducted in the display device, and thus, the operation processing amount in the GPU can be reduced. Further, the number of parts necessary for the image processing device can be reduced, whereby the display system can be downsized and reduced in weight. Furthermore, in the case where a static image is displayed, or in the case where only a part of the image data is changed, it is sufficient that the very minimum image data is rewritten, and thus, the power consumption can be greatly reduced. Therefore, the display device appropriate for the high-definition and large-size image display and the display system using the display device can be realized.

Embodiment 3

In this embodiment, description will be made of a method of simultaneously forming TFTs of a pixel portion and of driver circuits (row decoder circuit, column decoder circuit) provided in the periphery thereof in the display device according to the present invention. Note that, in this specification, a substrate on which a driver circuit comprised of a CMOS circuit and a pixel portion having a switching TFT and a driver TFT are formed is referred to as an active matrix substrate for the sake of convenience. In this embodiment, a manufacturing process of the active matrix substrate is described with reference to FIGS. 6A to 7D. Note that the TFT takes a top gate structure in this embodiment. However, the TFT can also be realized by adopting a bottom gate structure or a dual gate structure.

A quartz substrate, a silicon substrate, or a metal or stainless substrate formed with an insulating film on its surface is used as a substrate 5000. Further, a plastic substrate having heat-resistance, which can withstand a process temperature in the manufacturing process, may also be used. In this embodiment, there is used the substrate 5000 made of glass such as barium borosilicate glass or alumino borosilicate glass.

Next, a base film 5001 comprised of an insulating film such as a silicon oxide film, a silicon nitride film, or a silicon oxynitride film is formed on the substrate 5000. The base film 5001 in this embodiment takes a two-layer structure. However, there may be adopted a single layer structure of the insulating film or a structure in which two or more layers of the insulating film are laminated.

In this embodiment, as the first layer of the base film 5001, a silicon oxynitride film 5001*a* is formed from $SiH_4$, $NH_3$, and $N_2O$ as a reaction gas to have a thickness of 10 to 200 nm (preferably 50 to 100 nm) by a plasma CVD method. In this embodiment, the silicon oxynitride film 5001*a* is formed with a thickness of 50 nm. Then, as the second layer of the base film 5001, a silicon oxynitride film 5001*b* is formed from $SiH_4$ and $N_2O$ as a reaction gas to have a thickness of 50 to 200 nm (preferably 100 to 150 nm) by the plasma CVD method. In this embodiment, the silicon oxynitride film 5001*b* is formed with a thickness of 100 nm.

Subsequently, semiconductor layers 5002 to 5005 are formed on the base film 5001. As to the semiconductor layers 5002 to 5005, a semiconductor film is formed with a thickness of 25 to 80 nm (preferably 30 to 60 nm) by a known means (sputtering method, LPCVD method, plasma CVD method, or the like). Then, the semiconductor film is crystallized by a known crystallization method (laser crystallization method, thermal crystallization method using RTA or furnace annealing, thermal crystallization method using a metal element that promotes crystallization, or the like). Then, the thus obtained crystalline semiconductor film is patterned into a desired shape to form the semiconductor layers 5002 to 5005. Note that an amorphous semiconductor film, a microcrystalline semiconductor film, a crystalline semiconductor film, a compound semiconductor film with an amorphous structure such as an amorphous silicon germanium film, or the like may be used as the semiconductor film.

In this embodiment, a 55-nm-thick amorphous silicon film is formed by using the plasma CVD method. Then, a solution containing nickel is applied onto the amorphous silicon film, dehydrogenation (500° C., 1 hour) is performed to the amorphous silicon film, and then, thermal crystallization (550° C., 4 hours) is conducted thereto, thereby forming a crystalline silicon film. Thereafter, the semiconductor layers 5002 to 5005 are formed by a patterning process using a photolithography method.

Note that a continuous oscillation or pulse oscillation type gas laser or solid laser may be used as a laser used in the case where the crystalline semiconductor film is formed by the laser crystallization method. As the former gas laser, an excimer laser, YAG laser, $YVO_4$ laser, YLF laser, $YAlO_3$ laser, glass laser, ruby laser, Ti:sapphire laser, or the like may be used. Also, as the latter solid laser, there may be used a laser which uses crystals such as YAG, $YVO_4$, YLF, or $YAlO_3$ which is doped with Cr, Nd, Er, Ho, Ce, Co, Ti or Tm. A fundamental wave of the laser concerned differs depending on the material to be doped, and the laser light having a fundamental wave of about 1 μm is obtained. A harmonic wave with respect to the fundamental wave can be obtained by using a non-linear optical element. Note that, in crystallization of the amorphous semiconductor film, it is preferable that the solid laser capable of conducting continuous oscillation is used and that a second harmonic wave to a fourth harmonic wave with respect to the fundamental wave is applied in order to obtain crystals with a large grain size. Typically, the second harmonic wave (532 nm) or third harmonic wave (355 nm) of an Nd:$YVO_4$ laser (fundamental wave of 1064 nm) is applied.

Further, the laser light emitted from the continuous oscillation type $YVO_4$ laser with an output of 10 W is converted into a harmonic wave by the non-linear optical element. Moreover, there is a method of putting $YVO_4$ crystals and a non-linear optical element into a resonator, thereby emitting a harmonic wave. The harmonic wave is formed into the laser light with a rectangular shape or an elliptical shape on an irradiation surface by an optical system, and the laser light is irradiated to an object to be processed. The energy density at this time needs to be about 0.01 to 100 MW/cm$^2$ (preferably 0.1 to 10 MW/cm$^2$). Then, the semiconductor film is irradiated with the laser light while relatively being moved with respect to the laser light at a speed of about 10 to 2000 cm/s.

Further, in the case where the above laser is used, it is preferable that the laser beam emitted from a laser oscillator is condensed into a linear shape by an optical system to be irradiated to the semiconductor film. The crystallization conditions are appropriately set. However, in the case of using an excimer laser, it is preferable that the pulse oscillation frequency is 300 Hz and the laser energy density is 100 to 700 mJ/cm$^2$ (typically 200 to 300 mJ/cm$^2$). Further, in the case of using a YAG laser, it is preferable that the pulse oscillation frequency is 1 to 300 Hz and the laser energy density is 300 to 1000 mJ/cm$^2$ (typically 350 to 500 mJ/cm$^2$) by using the second harmonic wave. The laser light condensed into a linear shape with a width of 100 to 1000 μm (preferably width of 400 μm) is irradiated to the entire surface of the substrate. The overlap ratio of the linear beam at this time may be 50 to 98%.

However, in this embodiment, since the crystallization of the amorphous silicon film is conducted by using the metal element that promotes crystallization, the metal element remains in the crystalline silicon film. Therefore, an amorphous silicon film with a thickness of 50 to 100 nm is formed on the crystalline silicon film, and heat treatment (thermal annealing using RTA or furnace annealing, or the like) is performed thereto to diffuse the metal element into the amorphous silicon film. After the heat treatment, the amorphous silicon film is removed by conducting etching. As a result, the metal element in the crystalline silicon film can be reduced in content or removed.

Note that, after the semiconductor layers 5002 to 5005 are formed, doping of a minute amount of impurity element (boron or phosphorous) may be conducted for controlling the threshold value of a TFT.

Subsequently, a gate insulating film 5006 is formed which covers the semiconductor layers 5002 to 5005. The gate insulating film 5006 is formed of an insulating film containing silicon to have a thickness of 40 to 150 nm by using a plasma CVD method or a sputtering method. In this embodiment, as the gate insulating film 5006, a silicon oxynitride film is formed with a thickness of 115 nm by the plasma CVD method. Of course, the gate insulating film 5006 is not limited to the silicon oxynitride film, and another insulating film containing silicon may be used in a single layer structure or a laminate structure.

Note that, in the case where a silicon oxide film is used as the gate insulating film 5006, the gate insulating film may be formed such that: TEOS (tetraethyl orthosilicate) and $O_2$ are mixed by the plasma CVD method; a reaction pressure of 40 Pa and a substrate temperature of 300 to 400° C. are set; and an electric discharge is made with a high frequency (13.56 MHz) power density of 0.5 to 0.8 W/cm$^2$. The silicon oxide film formed through the above step can obtain a satisfactory characteristic as the gate insulating film 5006 by subsequent thermal annealing at 400 to 500° C.

Then, on the gate insulating film 5006, a first conductive film 5007 with a thickness of 20 to 100 nm and a second conductive film 5008 with a thickness of 100 to 400 nm are formed in lamination. In this embodiment, the first conductive film 5007 comprised of a 30 nm thick TaN film and the second conductive film 5008 comprised of a 370 nm thick W film are formed in lamination.

In this embodiment, the TaN film as the first conductive film 5007 is formed using a Ta target in an atmosphere containing nitrogen by a sputtering method. Further, the W film as the second conductive film 5008 is formed using a W target by a sputtering method. In addition, the W film may be formed by a thermal CVD method with the use of tungsten hexafluoride ($WF_6$). In any case, the W film needs to have lower resistance in order to be used for a gate electrode, and the resistivity of the W film is desirably 20 μΩcm or less. The W film can have lower resistance by enlarging the crystal grain. However, in the case where a large amount of impurity element such as oxygen exists in the W film, crystallization is inhibited, which leads to higher resistance. Therefore, the W film is formed with sufficient attention so as not to be mixed with impurities from a vapor phase in film deposition by a sputtering method with the use of a W target with a high purity (purity of 99.9999%). Thus, a resistivity of 9 to 20 μΩcm can be realized.

Note that the TaN film and the W film are used as the first conductive film 5007 and the second conductive film 5008, respectively, in this embodiment, but the materials for constituting the first conductive film 5007 and the second conductive film 5008 are not particularly limited. The first conductive film 5007 and the second conductive film 5008 each may be formed from an element selected from the group consisting of Ta, W, Ti, Mo, Al, Cu, Cr and Nd, or an alloy material or compound material which contains the element as a main constituent. Further, the conductive films may be formed of a semiconductor film typified by a polycrystalline silicon film doped with an impurity element such as phosphorous or an AgPdCu alloy.

Figure 6A:
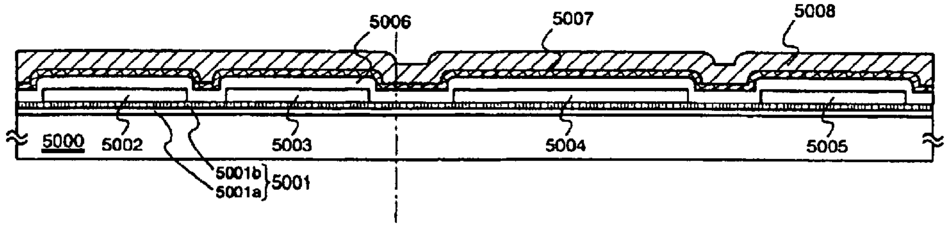
FIGS. 6A to 6D are sectional views showing a manufacturing process of a display device in accordance with Embodiment 3.
Figure 6B:
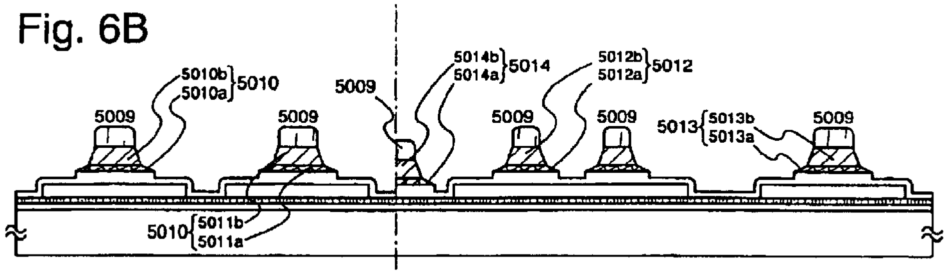
Figure 6C:
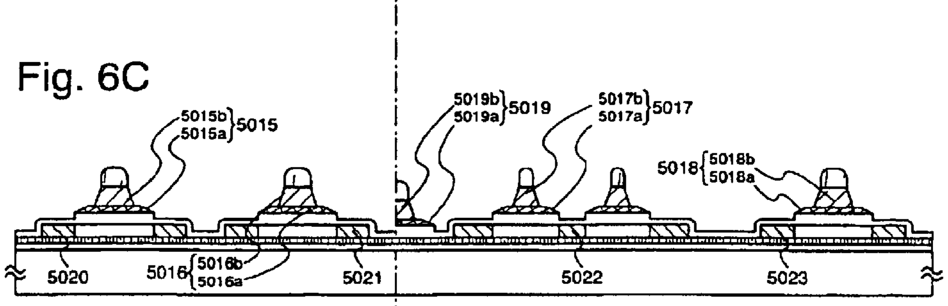
Figure 6D:
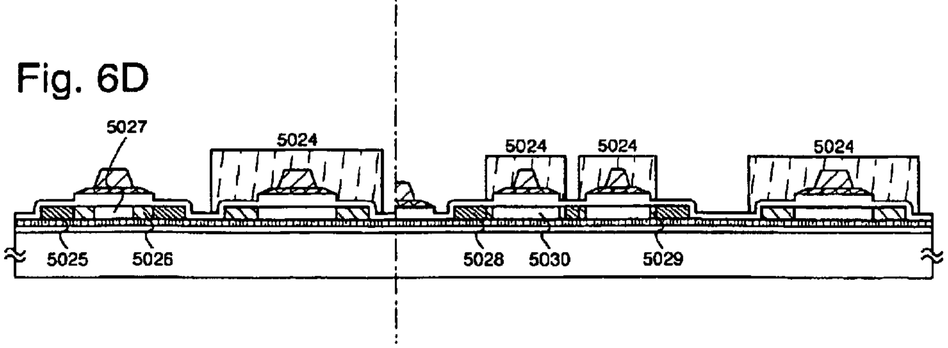

Next, a mask 5009 is formed of resist by using a photolithography method, and a first etching process for forming electrodes and wirings is performed. The first etching process is performed under first and second etching conditions. (FIG. 6B)

In this embodiment, as to the first etching conditions, etching is performed by using an ICP (inductively coupled plasma) etching method such that: $CF_4$, $Cl_2$ and $O_2$ are used as an etching gas; the gas flow rate is set to 25:25:10 sccm; and an RF (13.56 MHz) power of 500 W is applied to a coil shape electrode under a pressure of 1.0 Pa to generate plasma. An RF (13.56 MHz) power of 150 W is also applied to the substrate side (sample stage), and a substantially negative self-bias voltage is applied thereto. Then, the W film is etched under the first etching conditions to form end portions of the first conductive film 5007 into a tapered shape.

Subsequently, the first etching conditions are changed into the second etching conditions without removing the mask 5009 made of resist. Etching is performed for about 15 seconds such that: $CF_4$ and $Cl_2$ are used as an etching gas; the gas flow rate is set to 30:30 sccm; and an RF (13.56 MHz) power of 500 W is applied to a coil shape electrode under a pressure of 1.0 Pa to generate plasma. An RF (13.56 MHz) power of 20 W is also applied to the substrate side (sample stage), and a substantially negative self-bias voltage is applied thereto. Under the second etching conditions, both the first conductive layer 5007 and the second conductive layer 5008 are etched to substantially the same level. Note that an etching time may be increased at a rate of about 10 to 20% in order to perform etching without residue on the gate insulating film 5006.

In the first etching process, the mask made of resist is formed into an appropriate shape, whereby the end portions of the first conductive layer 5007 and of the second conductive layer 5008 are formed into a tapered shape due to an effect of the bias voltage applied to the substrate side. In this way, first shape conductive layers 5010 to 5014 that each consist of the first conductive layer 5007 and the second conductive layer 5008 are formed by the first etching process. In the gate insulating film 5006, the regions reduced in thickness are formed because the regions are not covered by the first shape conductive layers 5010 to 5014 and etched by about 20 to 50 nm.

Next, a second etching process is performed without removing the mask 5009 made of resist. (FIG. 6C) In the second etching process, etching is performed for about 25 seconds such that: $SF_6$, $Cl_2$ and $O_2$ are used as an etching gas; the gas flow rate is set to 24:12:24 sccm; an RF (13.56 MHz) power of 700 W is applied to the coil side under a pressure of 1.3 Pa to generate plasma. An RF (13.56 MHz) power of 10 W is also applied to the substrate side (sample stage), and a substantially negative self-bias voltage is applied. In this way, the W film is selectively etched to form second shape conductive layers 5015 to 5019. At this time, first conductive layers 5015*a* to 5019*a* are hardly etched.

Then, a first doping process is performed without removing the mask 5009 made of resist to add an impurity element imparting n-type conductivity to the semiconductor layers 5002 to 5005 at a low concentration. The first doping process may be conducted by an ion doping method or an ion implantation method. As to the conditions of the ion doping method, doping is performed with a dosage of $1\times10^{13}$ to $5\times10^{14}$ atoms/cm$^2$ and an acceleration voltage of 40 to 80 keV. In this embodiment, doping is performed with a dosage of $5.0\times10^{14}$ atoms/cm$^2$ and an acceleration voltage of 50 keV. An element belonging to group 15 may be used as the impurity element imparting n-type conductivity. Phosphorous (P) or arsenic (As) is typically used, and phosphorous (P) is used in this embodiment. In this case, the second shape conductive layers 5015 to 5019 serve as masks against the impurity element imparting n-type conductivity, and first impurity regions (n−−regions) 5020 to 5023 are formed in a self-aligning manner. Then, the impurity element imparting n-type conductivity is added to the first impurity regions 5020 to 5023 in a concentration range of $1\times10^{18}$ to $1\times10^{20}$ atoms/cm$^3$.

Subsequently, after the mask 5009 made of resist is removed, a mask 5024 made of resist is newly formed, and a second doping process is performed at an acceleration voltage higher than that in the first doping process. As to the conditions of the ion doping method, doping is performed with a dosage of $1\times10^{13}$ to $3\times10^{15}$ atoms/cm$^2$ and an acceleration voltage of 60 to 120 keV. In this embodiment, doping is performed with a dosage of $3.0\times10^{15}$ atoms/cm$^2$ and an acceleration voltage of 65 keV. The second doping process is performed using second conductive layers 5015*b* to 5019*b* as masks against the impurity element such that the impurity element is added to the semiconductor layers under the tapered portions of the first conductive layers 5015*a* to 5019*a*.

As a result of conducting the second doping process, a second impurity region (n− region, Lov region) 5026 which overlaps the first conductive layer is added with the impurity element imparting n-type conductivity in a concentration range of $1\times10^{18}$ to $5\times10^{19}$ atoms/cm$^3$. Also, third impurity regions (n+ regions) 5025 and 5028 are added with the impurity element imparting n-type conductivity in a concentration range of $1\times10^{19}$ to $5\times10^{21}$ atoms/cm$^3$. Further, after the first and second doping processes, regions to which no impurity element is completely added or regions to which a minute amount of impurity element is added are formed in the semiconductor layers 5002 to 5005. In this embodiment, the regions to which no impurity element is added or the regions to which a minute amount of impurity element is added are called channel regions 5027 and 5030. Further, among the first impurity regions (n−− regions) 5020 to 5023 formed by the first doping process, a region exists which is covered by the resist 5024 in the second doping process. The region is continuously called a first impurity region (n−− region, LDD region) 5029 in this embodiment.

Note that the second impurity region (n− region) 5026 and the third impurity regions (n+ regions) 5025 and 5028 are formed by only the second doping process in this embodiment, but the present invention is not limited to this. The above regions may be formed by plural doping processes while appropriately changing the doping process conditions.

Figure 7A:
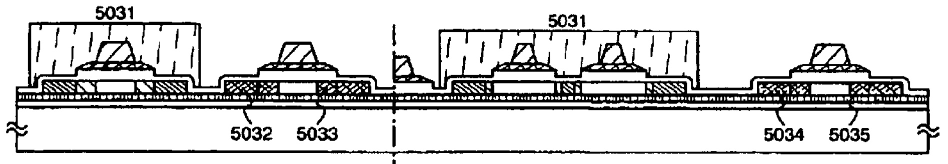
FIGS. 7A to 7D are sectional views showing the manufacturing process of a display device in accordance with Embodiment 3.

Then, as shown in FIG. 7A, after the mask 5024 made of resist is removed, a mask 5031 made of resist is newly formed. Thereafter, a third doping process is performed. Through the third doping process, fourth impurity regions (p+ regions) 5032 and 5034 and fifth impurity regions (p− regions) 5033 and 5035, which are added with an impurity element imparting conductivity opposite to the first conductivity, are formed into the semiconductor layers that serve as active layers of p-channel TFTs.

In the third doping process, the second conductive layers 5016*b* and 5018*b* are used as masks against the impurity element. In this way, the impurity element imparting p-type conductivity is added to form the fourth impurity regions (p+ regions) 5032 and 5034 and the fifth impurity regions (p− regions) 5033 and 5035 in a self-aligning manner.

In this embodiment, the fourth impurity regions 5032 and 5034 and the fifth impurity regions 5033 and 5035 are formed by an ion doping method using diborane ($B_2H_6$). As the conditions of the ion doping method, a dosage of $1\times10^{16}$ atoms/cm$^2$ and an acceleration voltage of 80 keV are adopted.

Note that the semiconductor layers for forming n-channel TFTs are covered with the mask 5031 made of resist in the third doping process.

Here, by the first and second doping processes, the fourth impurity regions (p+ regions) 5032 and 5034 and the fifth impurity regions (p− regions) 5033 and 5035 have been added with phosphorous at different concentrations. However, any of the fourth impurity regions (p+ regions) 5032 and 5034 and the fifth impurity regions (p− regions) 5033 and 5035 is subjected to the third doping process such that the concentration of the impurity element imparting p-type conductivity is $1\times10^{19}$ to $5\times10^{21}$ atoms/cm$^3$. Thus, the fourth impurity regions (p+ regions) 5032 and 5034 and the fifth impurity regions (p− regions) 5033 and 5035 function as source regions and drain regions of the p-channel TFTs without problems.

Note that the fourth impurity regions (p+ regions) 5032 and 5034 and the fifth impurity regions (p− regions) 5033 and 5035 are formed by only the third doping process in this embodiment, but the present invention is not limited to this. The above regions may be formed by plural doping processes while appropriately changing the doping process conditions.

Figure 7B:
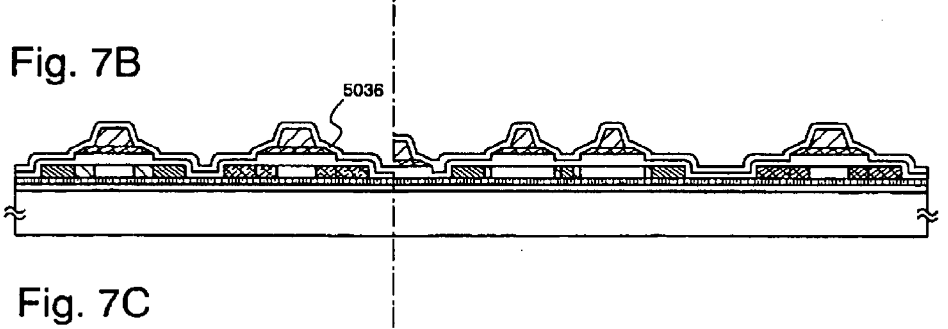

Then, as shown in FIG. 7B, the mask 5031 made of resist is removed, and then, a first interlayer insulating film 5036 is formed. As the first interlayer insulating film 5036, an insulating film containing silicon is formed to have a thickness of 100 to 200 nm by using a plasma CVD method or a sputtering method. In this embodiment, a silicon oxynitride film with a thickness of 100 nm is formed by the plasma CVD method. Of course, the first interlayer insulating film 5036 is not limited to the silicon oxynitride film, and another insulating film containing silicon may be used in a single layer or laminate structure.

Figure 7C:
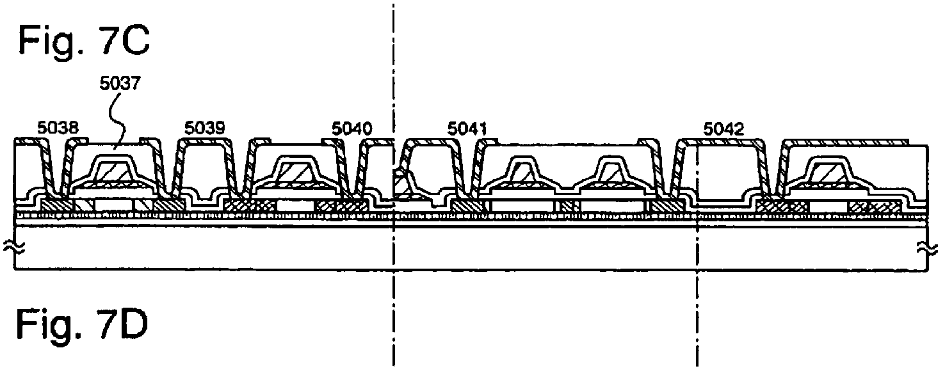

Then, as shown in FIG. 7C, heat treatment (thermal treatment) is conducted to recover the crystallinity of the semiconductor layers and activate the impurity elements added to the semiconductor layers. The heat treatment is conducted by a thermal annealing method using furnace annealing. The thermal annealing method is preferably conducted in a nitrogen atmosphere at an oxygen concentration of 1 ppm or less, preferably 0.1 ppm or less at 400 to 700° C. In this embodiment, the activation process is performed by thermal treatment at 410° C. for 1 hour. Note that, in addition to the thermal annealing method, a laser annealing method or a rapid thermal annealing method (RTA method) may be applied.

Further, heat treatment may be performed before the formation of the first interlayer insulating film 5036. Incidentally, in the case where the materials that constitute the first conductive layers 5015*a* to 5019*a* and the second conductive layers 5015*b* to 5019*b* are easily affected by heat, it is preferable that heat treatment is conducted after the first interlayer insulating film 5036 (insulating film containing silicon as a main constituent, for example, silicon nitride film) is formed in order to protect wirings and the like, as in this embodiment.

Heat treatment is conducted after the formation of the first interlayer insulating film 5036 (insulating film containing silicon as a main constituent, for example, silicon nitride film) as described above, whereby hydrogenation of the semiconductor layers can be performed simultaneously with the activation process. In the hydrogenation step, dangling bonds of the semiconductor layers are terminated by hydrogen contained in the first interlayer insulating film 5036.

Note that heat treatment for hydrogenation may be performed in addition to the heat treatment for the activation process.

Here, the semiconductor layers can be hydrogenated irrespective of the existence of the first interlayer insulating film 5036. As another means for hydrogenation, there may be used means with the use of hydrogen excited by plasma (plasma hydrogenation) or means of conducting heat treatment at 300 to 450° C. for 1 to 12 hours in an atmosphere containing 3 to 100% of hydrogen.

Next, a second interlayer insulating film 5037 is formed on the first interlayer insulating film 5036. An inorganic insulating film may be used as the second interlayer insulating film 5037. For example, a silicon oxide film formed by a CVD method, a silicon oxide film applied by an SOG (spin on glass) method, or the like may be used. In addition, as the second interlayer insulating film 5037, an organic insulating film may be used. For example, a film made of polyimide, polyamide, BCB (benzocyclobutene), acrylic, or the like may be used. Further, a laminate structure of an acrylic film and a silicon oxynitride film may also be used.

In this embodiment, an acrylic film with a thickness of 1.6 μm is formed. The second interlayer insulating film 5037 can reduce unevenness due to the TFTs formed on the substrate 5000 and provide levelness. Particularly, the second interlayer insulating film 5037 is provided mainly for attaining levelness, and thus is preferably a film excellent in levelness.

Next, the second interlayer insulating film 5037, the first interlayer insulating film 5036, and the gate insulating film 5006 are etched by using dry etching or wet etching, thereby forming contact holes that reach the third impurity regions 5025 and 5028 and the fourth impurity regions 5032 and 5034.

Subsequently, wirings 5038 to 5041 and a pixel electrode 5042, which are electrically connected with the respective impurity regions, are formed. Note that these wirings are formed by patterning a laminate film consisting of a 50 nm thick Ti film and a 500 nm thick alloy film (alloy film of Al and Ti). Of course, the present invention is not limited to a two-layer structure, and a single layer structure or a laminate structure of three or more layers may be adopted. Further, the material for wirings is not limited to Al and Ti. For example, the wirings may be formed by patterning a laminate film in which an Al film or a Cu film is formed on a TaN film, and a Ti film is further formed thereon. In any case, a material excellent in reflecting property is desirably used.

Thereafter, an orientation film 5043 is formed on a portion at least containing the pixel electrode 5042, and a rubbing process is performed thereto. Note that, in this embodiment, a columnar spacer 5045 for maintaining a substrate interval is formed at a desired position by patterning an organic resin film such as an acrylic resin film before the orientation film 5043 is formed. Further, a spherical spacer may be scattered over the surface of the substrate instead of the columnar spacer.

Next, a counter substrate 5046 is prepared. Colored layers (color filters) 5047 to 5049 and a leveling film 5050 are formed on the counter substrate 5046. At this time, the first colored layer 5047 and the second colored layer 5048 are overlapped to form a light shielding portion. Further, the first colored layer 5047 and the third colored layer 5049 may be partially overlapped to form a light shielding portion. Alternatively, the second colored layer 5048 and the third colored layer 5049 may be partially overlapped to form a light shielding portion.

In this way, a gap between pixels is shielded against light by the light shielding portion comprised of a lamination layer of the colored layers without newly forming a light shielding portion. Thus, the number of steps can be reduced.

Then, a counter electrode 5051 comprised of a transparent conductive film is formed at least on a portion, which corresponds to a pixel portion, of the leveling film 5050, and an orientation film 5052 is formed over the substrate of the counter substrate. Then, a rubbing process is performed thereto.

Figure 7D:
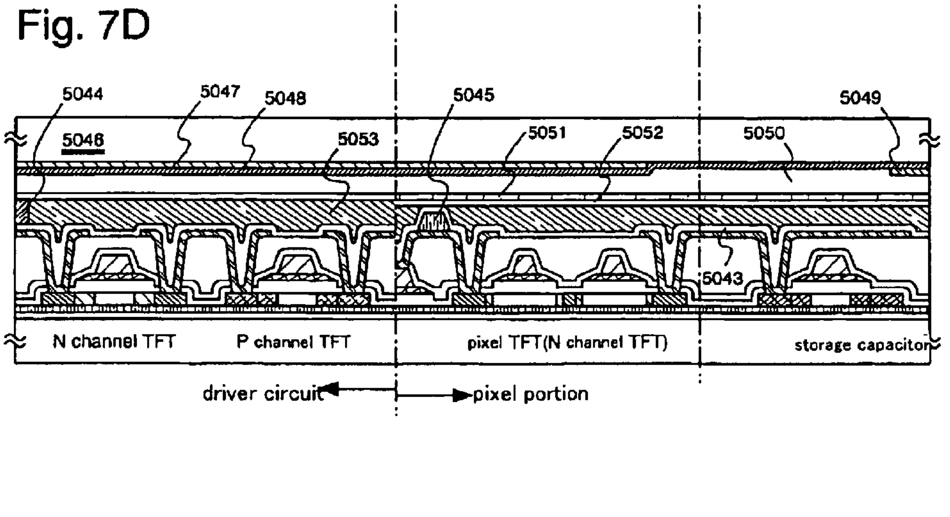

Then, the active matrix substrate on which the pixel portion and the driver circuit are formed and the counter substrate are bonded to each other by a sealing material 5044. The sealing material 5044 is mixed with a filler, and the two substrates are bonded while a uniform interval is kept by the filler and the columnar spacer. Thereafter, a liquid crystal material 5053 is injected between both the substrates, and complete sealing is conducted with a sealant (not shown). A known liquid crystal material may be used as the liquid crystal material 5053. Thus, the liquid crystal display device shown in FIG. 7D is completed. Then, if necessary, the active matrix substrate or the counter substrate is cut into a desired shape. Further, a polarizing plate and an FPC (not shown) are bonded to the liquid crystal display device.

The liquid crystal display device manufactured as described above has TFTs manufactured by using a semiconductor film in which crystal grains with a large grain size are formed, and thus provides the sufficient operational characteristic and reliability. Further, the liquid crystal display devices can be used as display portions of various electronic devices.

Note that this embodiment can be applied to a manufacturing process of the display device having the pixels, which is described in Embodiment 1 or Embodiment 2.

Embodiment 4

In this embodiment, description will be made of a manufacturing process of an active matrix substrate with a structure different from that in Embodiment 3 with reference to FIGS. 8A to 8D.

Figure 8A:
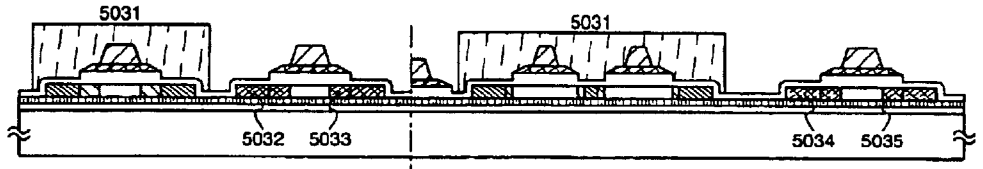
FIGS. 8A to 8D are sectional views showing a manufacturing process of a display device in accordance with Embodiment 4.
Figure 8B:
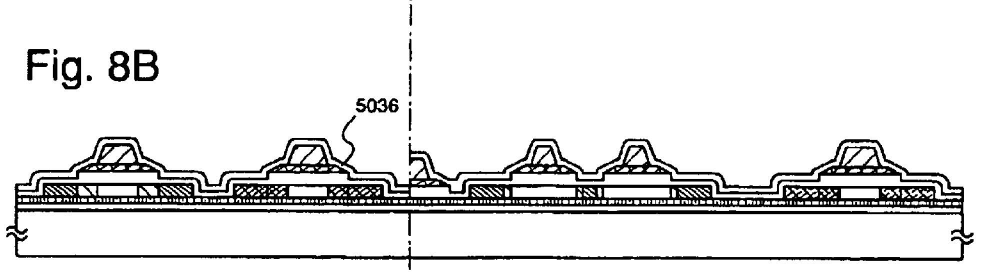
Figure 8C:
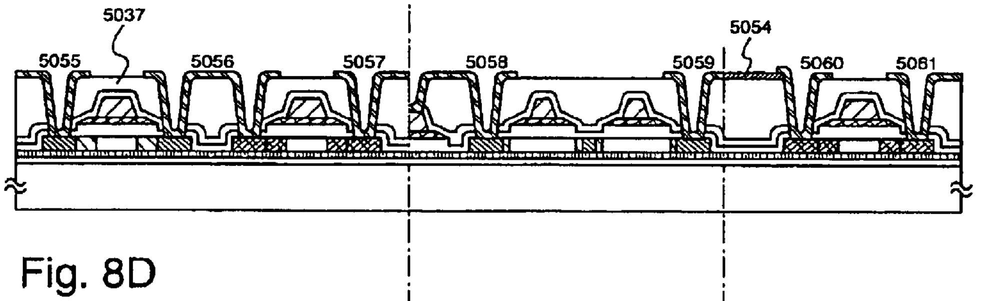

Note that the steps up through the step of FIG. 8B are the same as those of FIGS. 6A to 6D and FIGS. 7A and 7B.

In FIGS. 8A to 8D, the parts that are the same as those in FIGS. 6A to 6D and FIGS. 7A to 7D are denoted by the same reference numerals, and description thereof is omitted.

The second interlayer insulating film 5037 is formed on the first interlayer insulating film 5036. An inorganic insulating film may be used as the second interlayer insulating film 5037. For example, a silicon oxide film formed by a CVD method, a silicon oxide film applied by an SOG (spin on glass) method, or the like may be used. In addition, as the second interlayer insulating film 5037, an organic insulating film may be used. For example, a film made of polyimide, polyamide, BCB (benzocyclobutene), acrylic, or the like may be used. Further, a laminate structure of an acrylic film and a silicon oxide film may also be used. Moreover, a laminate structure of an acrylic film and a silicon nitride film or silicon oxynitride film formed by a sputtering method may also be used.

In this embodiment, an acrylic film with a thickness of 1.6 μm is formed. The second interlayer insulating film 5037 can reduce unevenness due to the TFTs formed on the substrate 5000 and provide levelness. Particularly, the second interlayer insulating film 5037 is provided mainly for attaining levelness, and thus is preferably a film excellent in levelness.

Next, the second interlayer insulating film 5037, the first interlayer insulating film 5036, and the gate insulating film 5006 are etched by using dry etching or wet etching, thereby forming contact holes that reach the third impurity regions 5025 and 5028 and the fourth impurity regions 5032 and 5034.

Then, a pixel electrode 5054 made of a transparent conductive film is formed. A compound of indium oxide and tin oxide (ITO), a compound of indium oxide and zinc oxide, zinc oxide, tin oxide, indium oxide, or the like can be used for the transparent conductive film. Further, the transparent conductive film added with gallium may also be used. The pixel electrode corresponds to an anode of the self-light emitting element.

In this embodiment, an ITO film is formed with a thickness of 110 nm, and is patterned, thereby forming the pixel electrode 5054.

Subsequently, wirings 5055 to 5061, which are electrically connected with the respective impurity regions, are formed. Note that, in this embodiment, the wirings 5055 to 5061 are provided by continuously forming a lamination film of a 100 nm thick Ti film, a 350 nm thick Al film and a 100 nm thick Ti film with a sputtering method and by patterning the lamination film into a desired shape.

Of course, the present invention is not limited to a three-layer structure, and a single layer structure, a two-layer structure or a laminate structure of four or more layers may be adopted. Further, the materials for wirings are not limited to Al and Ti, and other conductive films may be used. For example, the wirings may be formed by patterning a lamination film in which an Al or Cu film is formed on a TaN film, and a Ti film is further formed thereon.

Thus, one of a source region and a drain region of an n-channel TFT in the pixel portion is electrically connected to the source wiring (lamination layer consisting of the layers 5019*a* and 5019*b*) through the wiring 5058, and another region is electrically connected to the gate electrode of a p-channel TFT in the pixel portion through the wiring 5059. Further, one of the source region and the drain region of the p-channel TFT in the pixel portion is electrically connected to a pixel electrode 5063 through the wiring 5060. Here, a part of the pixel electrode 5063 and a part of the wiring 5060 are overlapped to establish electrical connection between the wiring 5060 and the pixel electrode 5063.

Figure 8D:
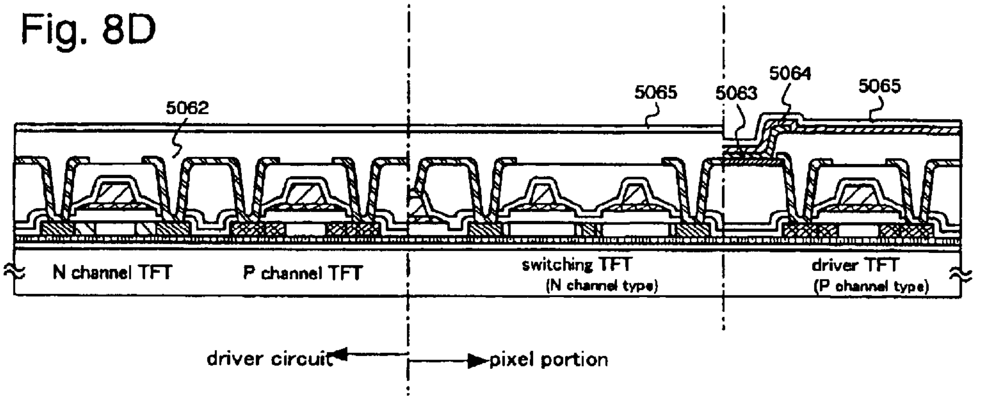

Through the above steps, as shown in FIG. 8D, a driver circuit portion having a CMOS circuit comprised of the n-channel TFT and the p-channel TFT and a pixel portion having a switching TFT and a driver TFT can be formed on the same substrate.

The n-channel TFT of the driver circuit portion has the low concentration impurity region 5026 (Lov region) that overlaps the first conductive layer 5015*a* constituting a part of the gate electrode and the high concentration impurity region 5025 that functions as the source region or drain region. The p-channel TFT, which is connected to the n-channel TFT through the wiring 5056 to form the CMOS circuit, has the low concentration impurity region 5033 (Lov region) that overlaps the first conductive layer 5016*a* constituting a part of the gate electrode and the high concentration impurity region 5032 that functions as the source region or drain region.

In the pixel portion, the n-channel type switching TFT has the low concentration impurity region 5029 (Loff region) that is formed outside the gate electrode and the high concentration impurity region 5028 that functions as the source region or drain region. Further, in the pixel portion, the p-channel type driver TFT has the low concentration impurity region 5035 (Lov region) that overlaps the first conductive layer 5018*a* constituting a part of the gate electrode and the high concentration impurity region 5034 that functions as the source region or drain region.

Next, a third interlayer insulating film 5062 is formed. An inorganic insulating film or an organic insulating film may be used as the third interlayer insulating film. A silicon oxide film formed by a CVD method, a silicon oxide film applied by an SOG (spin on glass) method, a silicon nitride film or silicon oxynitride film formed by a sputtering method, or the like may be used as the inorganic insulating film. In addition, as the organic insulating film, an acrylic resin film or the like may be used.

Examples of combination of the second interlayer insulating film 5037 and the third interlayer insulating film 5062 are given below.

A combination is given in which a lamination film of an acrylic film and a silicon nitride film or silicon oxynitride film which is formed by a sputtering method is used as the second interlayer insulating film 5037, and the silicon nitride film or silicon oxynitride film which is formed by a sputtering method is used as the third interlayer insulating film 5062. Another combination is given in which a silicon oxide film formed by a plasma CVD method is used as the second interlayer insulating film 5037, and the silicon oxide film formed by a plasma CVD method is also used as the third interlayer insulating film 5062. Another combination is given in which a silicon oxide film formed by an SOG method is used as the second interlayer insulating film 5037, and the silicon oxide film formed by an SOG method is also used as the third interlayer insulating film 5062. Another combination is given in which a lamination film of a silicon oxide film formed by an SOG method and a silicon oxide film formed by a plasma CVD method is used as the second interlayer insulating film 5037, and the silicon oxide film formed by a plasma CVD method is used as the third interlayer insulating film 5062. Another combination is given in which an acrylic film is used as the second interlayer insulating film 5037, and the acrylic film is also used as the third interlayer insulating film 5062. Another combination is given in which a lamination film of an acrylic film and a silicon oxide film formed by a plasma CVD method is used as the second interlayer insulating film 5037, and the silicon oxide film formed by a plasma CVD method is used as the third interlayer insulating film 5062. Another combination is given in which a silicon oxide film formed by a plasma CVD method is used as the second interlayer insulating film 5037 and an acrylic film is used as the third interlayer insulating film 5062.

An opening portion is formed at the position of the third interlayer insulating film 5062 which corresponds to the pixel electrode 5063. The third interlayer insulating film functions as a bank. In forming the opening portion, side walls with a tapered shape can be easily made by using a wet etching method. The deterioration of a self-light emitting layer due to a step becomes a conspicuous problem when the side walls of the opening portion are not sufficiently gentle, and thus, attention needs to be paid thereon.

Carbon particles or metal particles may be added into the third interlayer insulating film to lower the resistivity and suppress generation of static electricity. At this time, the addition amount of the carbon particles or metal particles may be adjusted such that the resistivity is $1\times10^{6}$ to $1\times10^{12}$ Ωm (preferably $1\times10^{8}$ to $1\times10^{10}$ Ωm).

Next, the self-light emitting layer 5063 is formed on the pixel electrode 5054 that is exposed in the opening portion of the third interlayer insulating film 5062.

Known organic light emitting materials and inorganic light emitting materials may be used for the self-light emitting layer 5063.

As the organic light emitting materials, a low molecular weight organic light emitting material, a high molecular weight organic light emitting material, and a middle molecular weight organic light emitting material may be freely used. Note that, in this specification, the middle molecular weight organic light emitting material indicates an organic light emitting material which does not have subliming property and the number of molecules of which is 20 or less or the length of linked molecules of which is 10 ìm or less.

The self-light emitting layer 5063 generally takes a laminate structure. Typically, there is given a laminate structure of "hole transporting layer/light emitting layer/electron transporting layer" which is proposed by Tang et al. of Eastman Kodak Company. In addition, there may be adopted a laminate structure on an anode in the order of a hole injecting layer/hole transporting layer/light emitting layer/electron transporting layer or a hole injecting layer/hole transporting layer/light emitting layer/electron transporting layer/electron injecting layer. A fluorescent pigment or the like may be doped to the light emitting layer.

In this embodiment, the self-light emitting layer 5063 is formed using the low molecular weight organic light emitting material by an evaporation method. Specifically, a laminate structure is taken in which a copper phthalocyanine (CuPc) film with a thickness of 20 nm is provided as a hole injecting layer, and a tris-8-quinolinolate aluminum complex ($Alq_3$) film with a thickness of 70 nm is provided thereon as a light emitting layer. A light emission color can be controlled by adding a fluorescent pigment such as quinacridon, perylene, or DCM1 to $Alq_3$.

Note that only one pixel is shown in FIG. 8D, but there can be adopted a structure in which separate self-light emitting layers 5063 are provided corresponding to a plurality of colors, for example, respective colors of R (red), G (green) and B (blue).

Further, as to an example of using the high molecular weight organic light emitting material, the self-light emitting layer 5063 may be comprised of a lamination structure in which a polythiophene (PEDOT) film with a thickness of 20 nm is provided as a hole injecting layer by a spin coating method, and a paraphenylene vinylene (PPV) film with a thickness of about 100 nm is provided thereon as a light emitting layer. Note that emission wavelength can be selected in a range of red color to blue color by using a δ-conjugated polymer material of PPV. Further, inorganic materials such as silicon carbide can be used for an electron transporting layer or an electron injecting layer.

Note that the self-light emitting layer 5063 is not limited to one with a laminate structure in which the hole injecting layer, hole transporting layer, light emitting layer, electron transporting layer, electron injecting layer, and the like are clearly distinguished one another. That is, the self-light emitting layer 5063 may have a structure including a layer in which respective materials for constituting the hole injecting layer, hole transporting layer, light emitting layer, electron transporting layer, electron injecting layer, and the like are mixed with one another.

For example, there may be provided the self-light emitting layer 5063 with a structure having between the electron transporting layer and the light emitting layer a mixed layer constituted of a material for constituting an electron transporting layer (hereinafter referred to as electron transporting material) and a material for constituting a light emitting layer (hereinafter referred to as light emitting material).

Next, a pixel electrode 5064 formed of a conductive film is provided on the self-light emitting layer 5063. In this embodiment, an alloy film of aluminum and lithium is used as the conductive film. Of course, a known MgAg film (alloy film of magnesium and silver) may be used. The pixel electrode 5064 corresponds to a cathode of the self-light emitting element. As to a cathode material, a conductive film comprised of an element belonging to group 1 or 2 of the periodic table or a conductive film added with the above element may be freely used.

At the point of time when the pixel electrode 5064 is completed, the self-light emitting element is completed. Note that the self-light emitting element indicates a diode constituted by the pixel electrode (anode) 5054, the self-light emitting layer 5063, and the pixel electrode (cathode) 5064. Note that the self-light emitting element may utilize either light emission from a singlet exciton (fluorescence) or light emission from a triplet exciton (phosphorescence).

It is effective that a passivation film 5065 is provided so as to completely cover the self-light emitting element. The passivation film 5065 may be comprised of an insulating film formed of a carbon film, a silicon nitride film, or a silicon oxynitride film in a single layer or a lamination layer in which the above insulating films are combined.

A film with a satisfactory coverage is preferably used as the passivation film 5065, and it is effective that a carbon film, particularly a DLC (diamond-like carbon) film is used. The DLC film can be formed in a temperature range of a room temperature to 100° C., and thus, can be easily formed above the self-light emitting layer 5063 with low heat-resistance. Further, the DLC film has a high blocking effect against oxygen and can suppress oxidation of the self-light emitting layer 5063. Therefore, a problem in that the self-light emitting layer 5063 oxidizes can be prevented.

Note that it is effective that the steps up through the formation of the passivation film 5065 after the formation of the third interlayer insulating film 5062 are continuously performed without exposure to an atmosphere by using a multi-chamber type (or in-line type) film deposition apparatus.

Note that, when the state shown in FIG. 8D is obtained in actuality, it is preferable that packaging (sealing) is conducted using a protective film (lamination film, ultraviolet cured resin film, or the like) with high airtightness and little degassing or a translucent sealing member in order to prevent further exposure to the outside air. In this case, an inert atmosphere is made in the interior of the sealing member, or a hygroscopic material (for example, barium oxide) is arranged in the interior thereof, thereby enhancing reliability of the self-light emitting element.

Further, after the airtightness is increased by a process such as packaging, a connector (flexible printed circuit: FPC) for connecting a terminal drawn from the element or circuit formed on the substrate 5000 to an external signal terminal is attached. Thus, a product is completed.

Note that this embodiment can be applied to a manufacturing process of the display device having the pixels, which is described in Embodiment 1 or Embodiment 2.

Embodiment 5

In this embodiment, description will be made of a manufacturing process of an active matrix substrate with a structure different from that in Embodiment 3 or 4 with reference to FIGS. 9A to 9D.

Figure 9A:
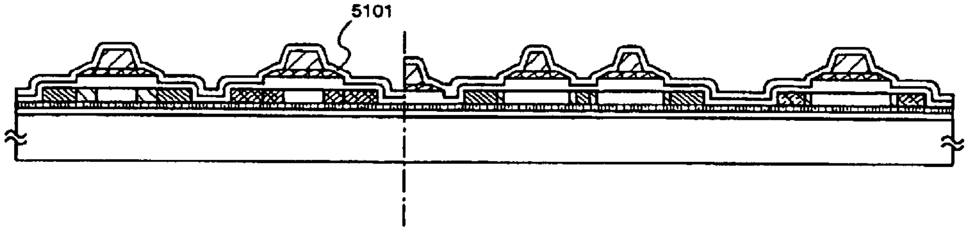
FIGS. 9A to 9D are sectional views showing a manufacturing process of a display device in accordance with Embodiment 5.

Note that the steps up through the step of FIG. 9A are the same as those of FIGS. 6A to 6D and FIG. 7A in Embodiment 3. Incidentally, a different point is that the driver TFT constituting the pixel portion is an n-channel TFT having a low concentration impurity region (Loff region) formed outside a gate electrode.

In FIGS. 9A to 9D, the parts that are the same as those in FIGS. 6A to 6D, FIGS. 7A to 7D, and FIGS. 8A to 8D are denoted by the same reference numerals, and description thereof is omitted.

As shown in FIG. 9A, the first interlayer insulating film 5101 is formed. The first interlayer insulating film 5101 is formed of an insulating film containing silicon with a thickness of 100 to 200 nm by using a plasma CVD method or a sputtering method. In this embodiment, a 100-nm-thick silicon oxynitride film is formed by the plasma CVD method. Of course, the first interlayer insulating film 5101 is not limited to the silicon oxynitride film, and another insulating film containing silicon may be used in a single layer or laminate structure.

Figure 9B:
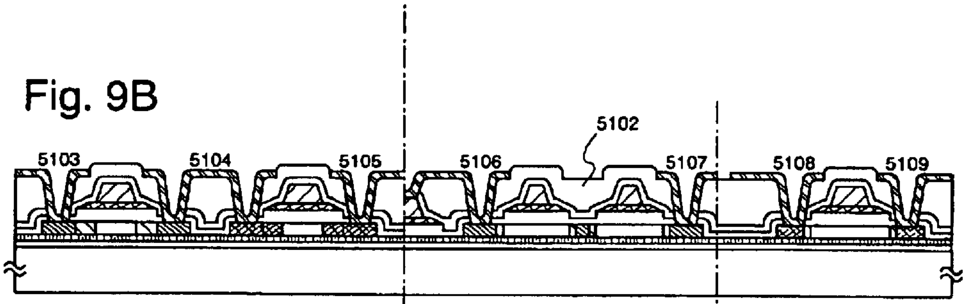

Then, as shown in FIG. 9B, heat treatment (thermal treatment) is conducted to recover the crystallinity of the semiconductor layers and activate the impurity elements added to the semiconductor layers. The heat treatment is conducted by a thermal annealing method using furnace annealing. The thermal annealing method may be conducted at 400 to 700° C. in a nitrogen atmosphere at an oxygen concentration of 1 ppm or less, preferably 0.1 ppm or less. In this embodiment, the activation process is performed by thermal treatment at 410° C. for 1 hour. Note that, in addition to the thermal annealing method, a laser annealing method or a rapid thermal annealing method (RTA method) can be applied.

Further, heat treatment may be performed before the formation of the first interlayer insulating film 5101. Incidentally, in the case where the first conductive layers 5015*a* to 5019*a* and the second conductive layers 5015*b* to 5019*b* are easily affected by heat, it is preferable that heat treatment is performed after the formation of the first interlayer insulating film 5101 (insulating film containing silicon as a main constituent, for example, silicon nitride film) in order to protect wirings and the like as in this embodiment.

The thermal treatment is performed after the formation of the first interlayer insulating film 5101 (insulating film containing silicon as a main constituent, for example, silicon nitride film) as described above, whereby hydrogenation of the semiconductor layers can be performed simultaneously with the activation process. In the hydrogenation step, dangling bonds of the semiconductor layers are terminated by hydrogen contained in the first interlayer insulating film 5101.

Note that heat treatment for hydrogenation may be performed in addition to the heat treatment for the activation process.

Here, the semiconductor layers can be hydrogenated irrespective of the existence of the first interlayer insulating film 5101. Further, as other means for hydrogenation, there may be used means with the use of hydrogen excited by plasma (plasma hydrogenation) or means for conducting heat treatment at 300 to 450° C. for 1 to 12 hours in an atmosphere containing 3 to 100% of hydrogen.

Through the above steps, a driver circuit portion having a CMOS circuit comprised of an n-channel TFT and a p-channel TFT and a pixel portion having a switching TFT and a driver TFT can be formed on the same substrate.

Then, a second interlayer insulating film 5102 is formed on the first interlayer insulating film 5101. An inorganic insulating film may be used as the second interlayer insulating film 5102. For example, a silicon oxide film formed by a CVD method, a silicon oxide film applied by an SOG (spin on glass) method, or the like may be used. In addition, as the second interlayer insulating film 5102, an organic insulating film may be used. For example, a film made of polyimide, polyamide, BCB (benzocyclobutene), acrylic, or the like may be used. Further, a laminate structure of an acrylic film and a silicon oxide film may also be used. Moreover, a laminate structure of an acrylic film and a silicon nitride film or silicon oxynitride film formed by a sputtering method may also be used.

Next, the first interlayer insulating film 5101, the second interlayer insulating film 5102, and the gate insulating film 5006 are etched by using dry etching or wet etching, thereby forming contact holes that reach impurity regions (third impurity regions (n+) and fourth impurity regions (p+)) of the respective TFTs constituting the driver circuit portion and the pixel portion.

Subsequently, wirings 5103 to 5109, which are electrically connected with the respective impurity regions, are formed. Note that, in this embodiment, the wirings 5103 to 5109 are provided by continuously forming a lamination film of a 100 nm thick Ti film, a 350 nm thick Al film, and a 100 nm thick Ti film with a sputtering method and by patterning the lamination film into a desired shape.

Of course, the present invention is not limited to a three-layer structure, and a single layer structure, a two-layer structure or a laminate structure of four or more layers may be adopted. Further, the materials for wirings are not limited to Al and Ti, and other conductive films may be used. For example, the wirings may be formed by patterning a lamination film in which an Al or Cu film is formed on a TaN film, and a Ti film is further formed thereon.

One of a source region and a drain region of the switching TFT in the pixel portion is electrically connected to the source wiring (lamination layer consisting of the layers 5019*a* and 5019*b*) through the wiring 5106, and the other region is electrically connected to the gate electrode of the driver TFT in the pixel portion through the wiring 5107.

Figure 9C:
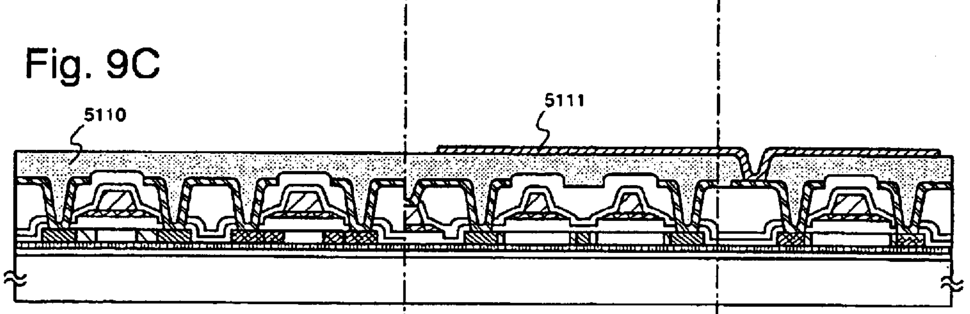

Next, a third interlayer insulating film 5110 is formed as shown in FIG. 9C. An inorganic insulating film or an organic insulating film may be used as the third interlayer insulating film 5110. A silicon oxide film formed by a CVD method, a silicon oxide film applied by an SOG (spin on glass) method, or the like may be used. In addition, as the organic insulating film, an acrylic resin film or the like may be used. Further, a laminate structure of an acrylic film and a silicon nitride film or silicon oxynitride film formed by a sputtering method may be adopted.

The third interlayer insulating film 5110 can reduce unevenness due to the TFTs formed on the substrate 5000 and provide levelness. Particularly, the third interlayer insulating film 5110 is provided mainly for attaining levelness, and thus is preferably a film excellent in levelness.

Next, dry etching or wet etching is used, thereby forming in the third interlayer insulating film 5110 a contact hole that reaches the wiring 5108.

Next, a pixel electrode 5111 is formed by patterning a conductive film. In this embodiment, an alloy film of aluminum and lithium is used as the conductive film. Of course, a known MgAg film (alloy film of magnesium and silver) may be used. The pixel electrode 5111 corresponds to a cathode of the self-light emitting element. As to a cathode material, a conductive film comprised of an element belonging to group 1 or 2 of the periodic table or a conductive film added with the above element may be freely used.

The pixel electrode 5111 has electrical connection with the wiring 5108 through the contact hole formed in the third interlayer insulating film 5110. Thus, the pixel electrode 5111 is electrically connected to one of a source region and a drain region of the driver TFT.

Figure 9D:
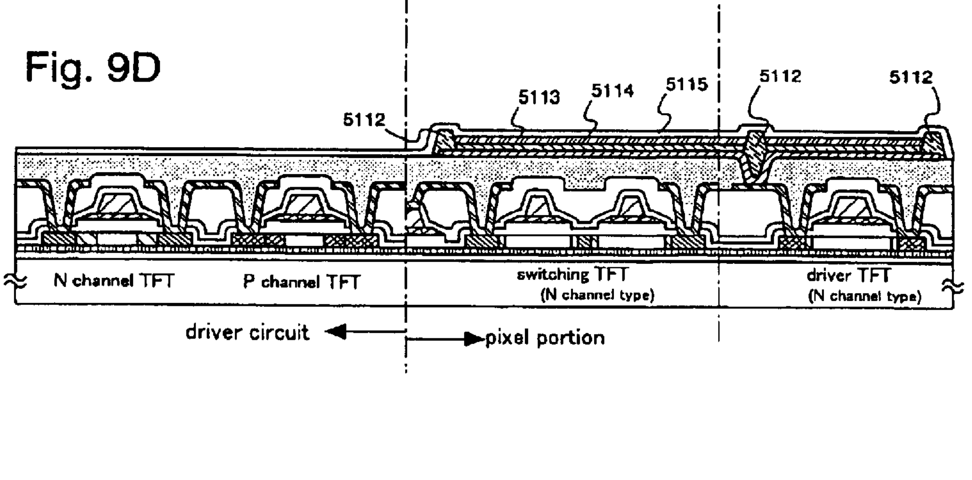

Next, as shown in FIG. 9D, a bank 5112 is formed in order to provide self-light emitting layers with different colors among pixels. The bank 5112 is formed by using an inorganic insulating film or an organic insulating film. As the inorganic insulating film, a silicon nitride film or silicon oxynitride film formed by a sputtering method, a silicon oxide film formed by a CVD method, a silicon oxide film applied by an SOG method, or the like may be used. Further, as the organic insulating film, an acrylic resin film or the like may be used.

In forming the bank 5112, side walls thereof with a tapered shape can be easily made by using a wet etching method. Incidentally, the deterioration of the self-light emitting layer due to a step becomes a conspicuous problem when the side walls of the bank 5112 are not sufficiently gentle, and thus, attention needs to be paid thereon.

Note that, when the pixel electrode 5111 and the wiring 5108 are electrically connected with each other, the bank 5112 is also formed in the contact hole formed in the third interlayer insulating film 5110. Thus, the unevenness of the pixel electrode due to the unevenness of the contact hole portion is filled with the bank 5112, whereby the deterioration of the self-light emitting layer due to a step is prevented.

Examples of combination of the third interlayer insulating film 5110 and the bank 5112 are given below.

A combination is given in which a lamination film of an acrylic film and a silicon nitride film or silicon oxynitride film which is formed by a sputtering method is used as the third interlayer insulating film 5110, and the silicon nitride film or silicon oxynitride film which is formed by a sputtering method is used as the bank 5112. Another combination is given in which a silicon oxide film formed by a plasma CVD method is used as the third interlayer insulating film 5110, and the silicon oxide film formed by a plasma CVD method is also used as the bank 5112. Another combination is given in which a silicon oxide film formed by an SOG method is used as the third interlayer insulating film 5110, and the silicon oxide film formed by an SOG method is also used as the bank 5112. Another combination is given in which a lamination film of a silicon oxide film formed by an SOG method and a silicon oxide film formed by a plasma CVD method is used as the third interlayer insulating film 5110, and the silicon oxide film formed by a plasma CVD method is used as the bank 5112. Another combination is given in which an acrylic film is used as the third interlayer insulating film 5110, and the acrylic film is also used as the bank 5112. Another combination is given in which a lamination film of an acrylic film and a silicon oxide film formed by a plasma CVD method is used as the third interlayer insulating film 5110, and the silicon oxide film formed by a plasma CVD method is used as the bank 5112. Another combination is given in which a silicon oxide film formed by a plasma CVD method is used as the third interlayer insulating film 5110, and an acrylic film is used as the bank 5112.

Carbon particles or metal particles may be added into the bank 5112 to lower the resistivity and suppress generation of static electricity. At this time, the addition amount of the carbon particles or the metal particles may be adjusted such that the resistivity is $1\times10^{6}$ to $1\times10^{12}$ Ωm (preferably $1\times10^{8}$ to $1\times10^{10}$ Ωm).

Next, a self-light emitting layer 5113 is formed on the pixel electrode 5111 that is surrounded by the bank 5112 and exposed.

Known organic light emitting materials and inorganic light emitting materials may be used for the self-light emitting layer 5113.

As the organic light emitting materials, a low molecular weight organic light emitting material, a high molecular weight organic light emitting material, and a middle molecular weight organic light emitting material may be freely used. Note that, in this specification, the middle molecular weight organic light emitting material indicates an organic light emitting material which does not have subliming property and the number of molecules of which is 20 or less or the length of linked molecules of which is 10 μm or less.

The self-light emitting layer 5113 generally takes a laminate structure. Typically, there is given a laminate structure of "hole transporting layer/light emitting layer/electron transporting layer" which is proposed by Tang et al. of Eastman Kodak Company. In addition, there may be adopted a laminate structure on a cathode in the order of an electron transporting layer/light emitting layer/hole transporting layer/hole injecting layer or an electron injecting layer/electron transporting layer/light emitting layer/hole transporting layer/hole injecting layer. A fluorescent pigment or the like may be doped to the light emitting layer.

In this embodiment, the self-light emitting layer 5113 is formed using the low molecular weight organic light emitting material by an evaporation method. Specifically, a laminate structure is taken in which a tris-8-quinolinolate aluminum complex ($Alq_3$) film with a thickness of 70 nm is provided as a light emitting layer, and a copper phthalocyanine (CuPc) film with a thickness of 20 nm is provided thereon as a hole injecting layer. A light emission color can be controlled by adding a fluorescent pigment such as quinacridon, perylene, or DCM1 to $Alq_3$.

Note that only one pixel is shown in FIG. 9D, but there can be adopted a structure in which separate self-light emitting layers 5113 are provided corresponding to a plurality of colors, for example, respective colors of R (red), G (green) and B (blue).

Further, as to an example of using the high molecular weight organic light emitting material, the self-light emitting layer 5113 may be comprised of a lamination structure in which a polythiophene (PEDOT) film with a thickness of 20 nm is provided as a hole injecting layer by a spin coating method, and a paraphenylene vinylene (PPV) film with a thickness of about 100 nm is provided thereon as a light emitting layer. Note that emission wavelength can be selected in a range of red color to blue color by using a $\pi$-conjugated polymer material of PPV. Further, inorganic materials such as silicon carbide can be used for an electron transporting layer or an electron injecting layer.

Note that the self-light emitting layer 5113 is not limited to a laminate structure in which the hole injecting layer, hole transporting layer, light emitting layer, electron transporting layer, electron injecting layer, and the like are clearly distinguished one another. That is, the self-light emitting layer 5113 may have a structure including a layer in which respective materials for constituting the hole injecting layer, hole transporting layer, light emitting layer, electron transporting layer, electron injecting layer, and the like are mixed with one another.

For example, there may be adopted the self-light emitting layer 5113 with a structure having between the electron transporting layer and the light emitting layer a mixed layer constituted of a material for constituting an electron transporting layer (hereinafter referred to as electron transporting material) and a material for constituting a light emitting layer (hereinafter referred to as light emitting material).

Then, a pixel electrode 5114 made of a transparent conductive film is formed on the self-light emitting layer 5113. A compound of indium oxide and tin oxide (ITO), a compound of indium oxide and zinc oxide, zinc oxide, tin oxide, indium oxide, or the like can be used for the transparent conductive film. Further, the transparent conductive film added with gallium may also be used. The pixel electrode 5114 corresponds to an anode of the self-light emitting element.

At the point of time when the pixel electrode 5114 is completed, the self-light emitting element is completed. Note that the self-light emitting element indicates a diode constituted by the pixel electrode (cathode) 5111, the self-light emitting layer 5113, and the pixel electrode (anode) 5114. Note that the self-light emitting element may utilize either light emission from a singlet exciton (fluorescence) or light emission from a triplet exciton (phosphorescence).

In this embodiment, since the pixel electrode 5114 is formed of a transparent conductive film, the light emitted from the self-light emitting element is radiated to the opposite side to the substrate 5000. Further, due to the third interlayer insulating film 5110, the pixel electrode 5111 is formed in the layer different from the layer in which the wirings 5106 to 5109 are formed. Thus, an aperture ratio can be raised in comparison with the structure in Embodiment 3.

It is effective that a protective film (passivation film) 5115 is provided so as to completely cover the self-light emitting element. The protective film 5115 may be comprised of an insulating film formed of a carbon film, a silicon nitride film, or a silicon oxynitride film in a single layer or a lamination layer in which the above insulating films are combined.

Note that, in the case where the light emitted from the self-light emitting element is radiated from the pixel electrode 5114 side as in this embodiment, a film that is transmitted with light needs to be used as the protective film 5115.

Note that it is effective that the steps up through the formation of the protective film 5115 after the formation of the bank 5112 are continuously performed without exposure to an atmosphere by using a multi-chamber type (or in-line type) film deposition apparatus.

Note that, when the state shown in FIG. 9D is obtained in actuality, it is preferable that packaging (sealing) is conducted using sealing member such as a protective film (lamination film, ultraviolet cured resin film, or the like) with high airtightness and little degassing in order to prevent further exposure to the outside air. In this case, an inert atmosphere is made in the interior of the sealing member, or a hygroscopic material (for example, barium oxide) is arranged in the interior thereof, thereby enhancing reliability of the self-light emitting element.

Further, after the airtightness is increased by a process such as packaging, a connector (flexible printed circuit: FPC) for connecting a terminal drawn from the element or circuit formed on the substrate 5000 to an external signal terminal is attached. Then, a product is completed.

Note that this embodiment can be applied to a manufacturing process of the display device having the pixels, which is described in Embodiment 1 or Embodiment 2.

Embodiment 6

This embodiment shows an example of a method for crystallizing a semiconductor film for producing a semiconductor active layer of a TFT included in a semiconductor apparatus of the present invention.

As a base film, a silicon oxynitride film (composition ratio: Si=32%, O=59%, N=7%, and H=2%) in 400 nm thick is formed on a glass substrate by plasma CVD method. Then, as a semiconductor film, 150 nm of amorphous silicon film is formed on the base film by plasma CVD method. Then, thermal processing at 500° C. is performed thereon for three hours so that hydrogen contained in the semiconductor film is discharged. After that, the semiconductor film is crystallized by laser annealing method.

As the laser used for laser annealing method, continuous oscillating $YVO_4$ laser is used. For the laser annealing method, the second harmonic (wavelength 532 nm) of the $YVO_4$ laser is used as laser light. As the beam in a predetermined form, laser light is irradiated to the semiconductor film formed on the substrate surface by using an optical system.

The form of the beam irradiated to the substrate can be varied depending on the type of laser or optical system. In this way, the aspect ratio and/or distribution of energy density of the beam irradiated onto the substrate can be changed. For example, various forms of the beam irradiated onto the substrate are possible such as linear, rectangular and elliptical forms. In this embodiment, the second harmonic of the $YVO_4$ laser in an elliptical form of 200 μm×50 μm is irradiated to the semiconductor film by using an optical system.

Figure 10:
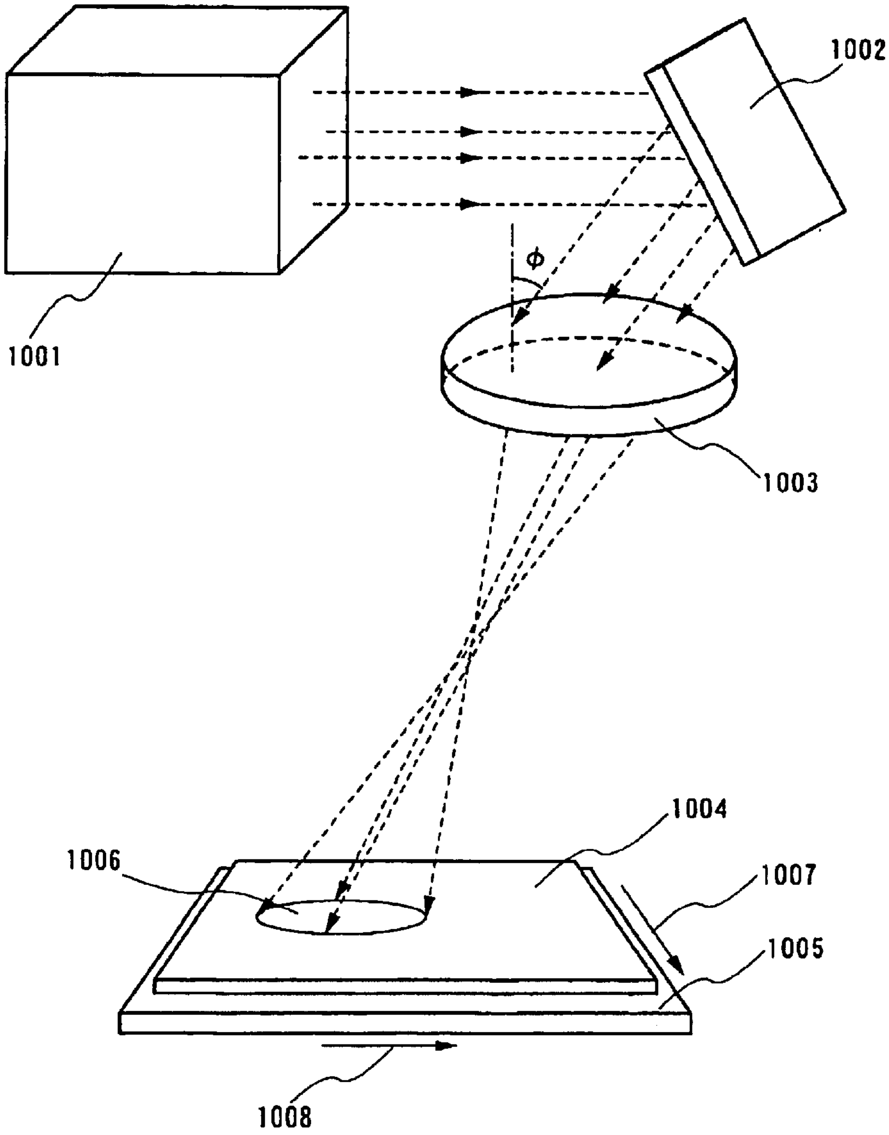
FIG. 10 is a schematic diagram of a laser optical system in accordance with Embodiment 6.

FIG. 10 shows a model diagram of an optical system, which is used when laser light is irradiated to a semiconductor film on a substrate surface.

Laser light (the second harmonic of $YVO_4$ laser) emitted from a laser 1001 enters a convex lens 1003 through a mirror 1002. The laser light enters to the convex lens 1003 diagonally. As a result, a focus position is shifted due to the aberration such as astigmatism. Thus, elliptical beam 1006 can be formed in an irradiated surface or near there.

Then, the elliptical beam 1006 formed in this way is irradiated, and a glass substrate 1005 is moved in a direction indicated by a reference numeral 1007 or 1008. Then, in the semiconductor film 1004 formed on the glass substrate 1005, the elliptical beam 1006 is irradiated by relatively being moved.

The relative scanning direction of the elliptical beam 1006 is perpendicular to the major axis of the elliptical beam 1006.

In this embodiment, the elliptical beam of 200 μm×50 μm is formed having incident angle $\phi$ of about 20° of laser light with respect to the convex lens 1003. The elliptical beam is irradiated on the glass substrate 1005 by being moved at the speed of 50 cm/s. Thus, the semiconductor film is crystallized.

Figure 11:
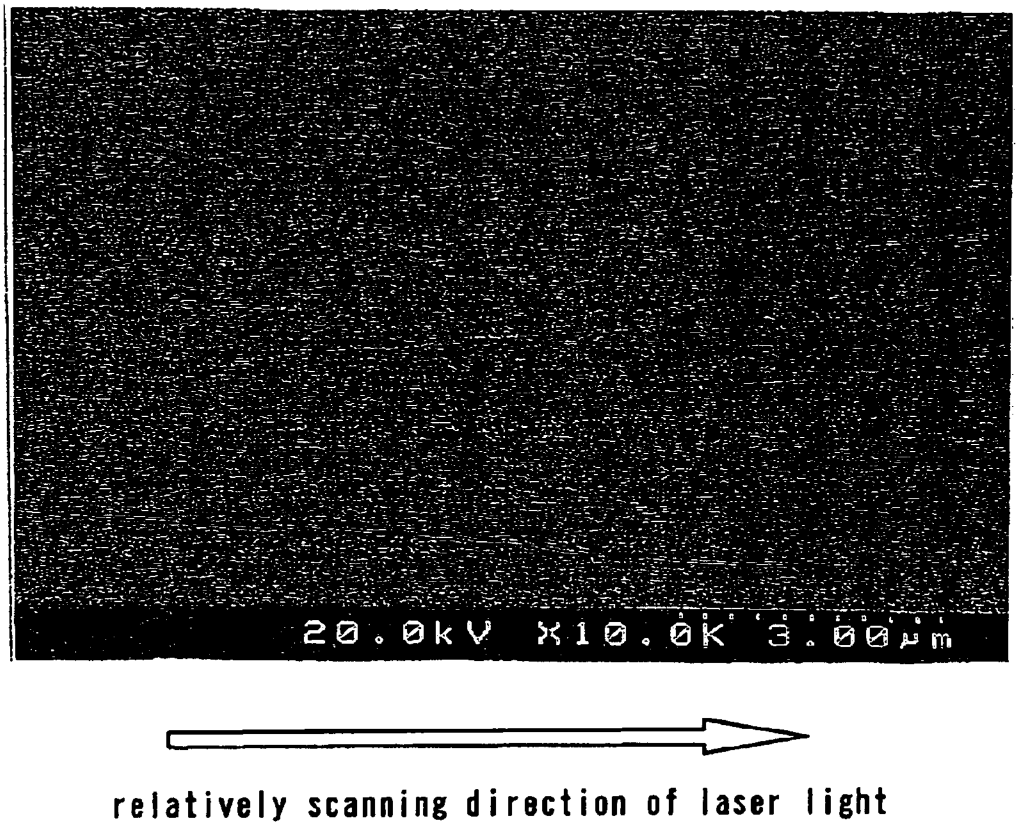
FIG. 11 shows an SEM photograph of a crystalline semiconductor film in accordance with Embodiment 6.

The seco etching is performed on the crystalline semiconductor film obtained in this way. FIG. 11 shows the result of the observation of the surface by using an SEM with 10,000 magnifications. The seco solution used for the seco etching is manufactured by adding $K_2Cr_2O_7$ as additive to $HF:H_2O=2:1$. One shown in FIG. 11 is obtained by relatively scanning laser light in a direction indicated by an arrow shown in FIG. 11. Large crystal grains are formed in parallel with the scanning direction of the laser light. In other words, the crystal is raised so as to extend in the scanning direction of the laser light.

In this way, large crystal grains are formed on the crystallized semiconductor film by using the method according to this embodiment. Therefore, when the semiconductor film is used as a semiconductor active layer to manufacture a TFT, the number of the crystal grain boundaries included in the channel forming area of the TFT can be reduced. In addition, each crystal grain internally has crystallinity, which is essentially single crystal. Therefore, the mobility (field effect mobility) as high as that of a transistor using a single crystal semiconductor can be obtained. An arithmetic processing circuit in the pixel can be operated at high speed by using the TFT, which has excellent characteristics for the display device of the present invention. Thus, the TFT is effective.

Furthermore, when the TFT is positioned such that the direction that the carrier moves can be the same as the direction that the formed crystal grains extend, the number of times that the carriers cross the crystal grain boundary can be extremely reduced. Therefore, a variation in ON current value (value of drain current flowing when the TFT is ON), an OFF current value (value of drain current flowing when the TFT is OFF), a threshold voltage, an S-value and field effect mobility can be reduced. As a result, the electric characteristic can be improved significantly.

In order to irradiate the elliptical beam 1006 in a wide range of the semiconductor film, the elliptical beam 1006 is scanned in a direction perpendicular to the major axis to irradiate to the semiconductor film multiple times. Here, the position of the elliptical beam 1006 is shifted in the direction parallel to the major axis for every single scan. The scanning direction becomes opposite between serial scans. In the serial two scans, one will be called outward scan and the other will be called inward scan hereinafter.

The amount of shifting the position of the elliptical beam 1006 to the direction parallel to the major axis for every single scan is expressed by pitch d. A reference numeral D1 indicates, in the outward scan, the length of the elliptical beam 1006 in the direction perpendicular to the scanning direction of the elliptical beam 1006 in an area having large crystal grains as shown in FIG. 11. A reference numeral D2 indicates, in the inward scan, the length of the elliptical beam 1006 in the direction perpendicular to the scanning direction of the elliptical beam 1006 in an area having large crystal grains as shown in FIG. 11. In this case, an average value of D1 and D2 is D.

Here, an overlap ratio $R_{O.L}$ [%] is defined by Equation 1.

$$R_{O.L}=(1-d/D)\times 100 \quad \text{[EQ1]}$$

In this embodiment, the overlap ratio $R_{O.L}$ is 0%.

Embodiment 7

This embodiment is different from the Embodiment 6 in the method for crystallizing a semiconductor film when a semiconductor active layer of a TFT included in the semiconductor device of the present invention is manufactured.

The steps up to forming an amorphous silicon film as a semiconductor film are the same as those of the Embodiment 6. After that, the method disclosed in Japanese Patent Application Laid-open No. Hei 7-183540 is used. Nickel acetate solution (5 ppm in weight conversion concentration and 10 ml in volume) is coated on the semiconductor film by spin coating method. Then, thermal processing is performed thereon in a nitrogen atmosphere at 500° C. for one hour and in a nitrogen atmosphere at 550° C. for twelve hours. Then, the crystallinity of the semiconductor film is improved by laser annealing method.

As the laser used for laser annealing method, continuous oscillating $YVO_4$ laser is used. For the laser annealing method, the second harmonic (wavelength 532 nm) of the $YVO_4$ laser is used as laser light. The elliptical beam of 200 μm×50 μm is formed having incident angle ϕ of about 20° of laser light with respect to the convex lens 1003 in the optical system shown in FIG. 10. The elliptical beam is moved and irradiated to the glass substrate 1005 at the speed of 50 cm/s. Thus, the crystallinity of the semiconductor film is improved.

The relative scanning direction of the elliptical beam 1006 is perpendicular to the major axis of the elliptical beam 1006.

Figure 12:
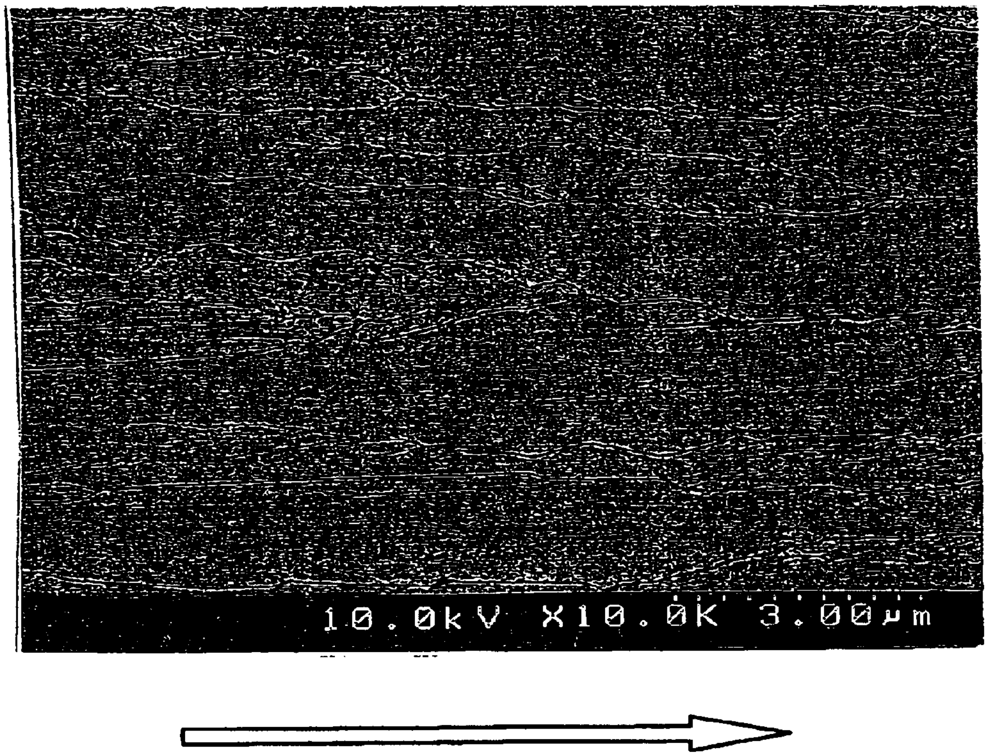
FIG. 12 shows an SEM photograph of a crystalline semiconductor film in accordance with Embodiment 7.

The seco etching is performed on the crystalline semiconductor film obtained in this way. FIG. 12 shows the result of the observation of the surface by using an SEM with 10,000 magnifications. One shown in FIG. 12 is obtained by relatively scanning laser light in a direction indicated by an arrow shown in FIG. 12. Large crystal grains extend in the scanning direction.

In this way, large crystal grains are formed on the crystallized semiconductor film according to the present invention. Therefore, when the semiconductor film is used to manufacture a TFT, the number of the crystal grain boundaries included in the channel forming area of the TFT can be reduced. In addition, each crystal grain internally has crystallinity, which is essentially single crystal. Therefore, the mobility (field effect mobility) as high as that of a transistor using a single crystal semiconductor can be obtained.

Furthermore, the formed crystal grains are aligned in one direction. Thus, when the TFT is positioned such that the direction that the carriers move can be the same as the direction that the formed crystal grains extend, the number of times that the carriers cross the crystal grain boundary can be extremely reduced. Therefore, a variation in ON current value, an OFF current value, a threshold voltage, an S-value and field effect mobility can be reduced. As a result, the electric characteristic can be improved significantly.

In order to irradiate the elliptical beam 1006 in a wide range of the semiconductor film, the elliptical beam 1006 is scanned in a direction perpendicular to the major axis to irradiate to the semiconductor film multiple times (this operation may be called scan). Here, the position of the elliptical beam 1006 is shifted in the direction parallel to the major axis for every single scan. The scanning direction becomes opposite between continuous scans. In the continuous two scans, one will be called outward scan and the other will be called inward scan hereinafter.

The amount of shifting the position of the elliptical beam 1006 to the direction parallel to the major axis for every single scan is expressed by pitch d. A reference numeral D1 indicates, in the outward scan, the length of the elliptical beam 1006 in the direction perpendicular to the scanning direction of the elliptical beam 1006 in an area having large crystal grains as shown in FIG. 12. A reference numeral D2 indicates, in the inward scan, the length of the elliptical beam 1006 in the direction perpendicular to the scanning direction of the elliptical beam 1006 in an area having large crystal grains as shown in FIG. 12. In this case, an average value of D1 and D2 is D.

Here, an overlap ratio $R_{O.L}$ [%] is defined like Equation 1. In this embodiment, the overlap ratio $R_{O.L}$ is 0%.

Figure 13:
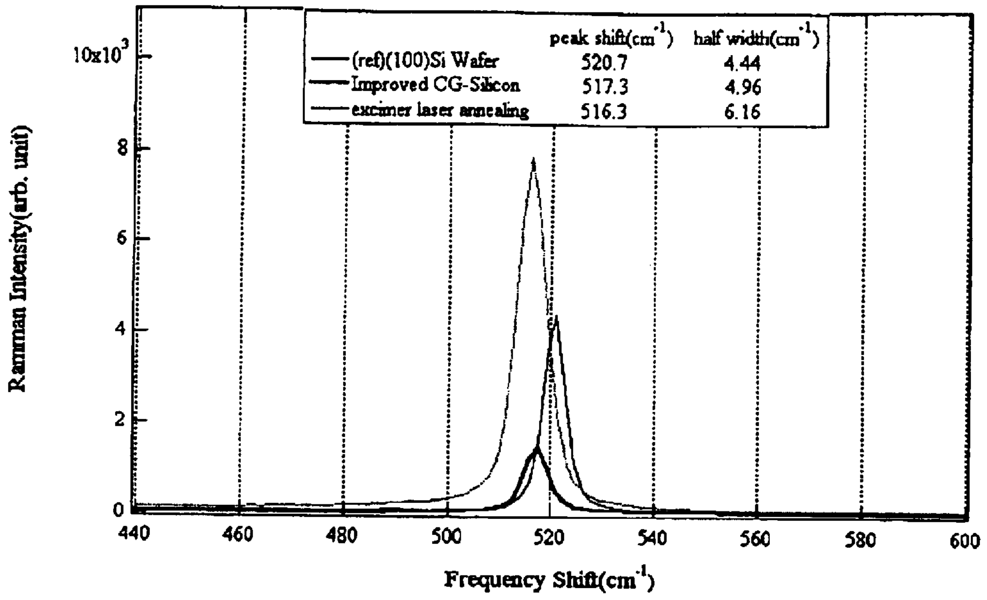
FIG. 13 shows a Raman spectrum of the crystalline semiconductor film in accordance with Embodiment 7.

In FIG. 13, a thick line indicates a result of Raman spectroscopy performed on the crystalline semiconductor film (represented by Improved CG-Silicon in FIG. 13) obtained by using the above-described crystallization method. Here, for comparison, a thin line indicates a result of Raman spectroscopy performed on the single crystal silicon (represented by ref. (100) Si Wafer in FIG. 13). In FIG. 13, a dotted line indicates a result of Raman spectroscopy performed on a semiconductor film (represented by excimer laser annealing in FIG. 13). In order to obtain the semiconductor film, an amorphous silicon film is formed and hydrogen contained in the semiconductor film is discharged through thermal processing. Then, the semiconductor film is crystallized by using excimer laser with pulse oscillation.

The Raman shift of the semiconductor film obtained by using the method of this embodiment has the peak at 517.3 $cm^{-1}$. The half value breadth is 4.96 $cm^{-1}$. On the other hand, the Raman shift of the single crystal silicon has the peak at 520.7 $cm^{-1}$. The half value breadth is 4.44 $cm^{-1}$. The Raman shift of the semiconductor film crystallized by using the excimer laser with the pulse oscillation has the peak at 516.3 $cm^{-1}$. The half value breadth is 6.16 $cm^{-1}$.

From the results in FIG. 13, the crystallinity of the semiconductor film obtained by using the crystallization method described in this embodiment is closer to that of the single crystal silicon than the crystallinity of the semiconductor film crystallized by using the excimer laser with pulse oscillation.

Embodiment 8

In this embodiment, a case where a semiconductor film crystallized by using the method described in the Embodiment 6 is used to manufacture a TFT will be described with reference to FIGS. 10, 14A to 14H and 15A and 15B.

Figure 14A:
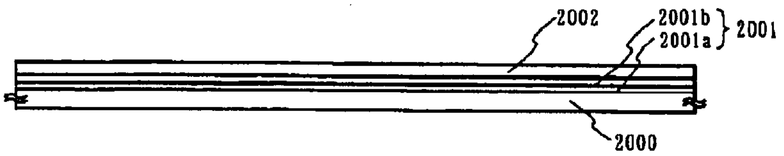
FIGS. 14A to 14H are sectional views showing a manufacturing process of TFTs in accordance with Embodiment 8.

A glass substrate is used as a substrate 2000 in this embodiment. As a base film 2001, 50 nm of silicon oxynitride film (composition ratio Si=32%, O=27%, N=24%, and H=17%) and 100 nm of silicon oxynitride film (composition ratio Si=32%, O=59%, N=7%, and H=2%) are stacked on the glass substrate by plasma CVD method. Next, as a semiconductor film 2002, 150 nm of amorphous silicon film is formed on the base film 2001 by plasma CVD method. Then, thermal processing is performed thereon at 500° C. for three hours to discharge hydrogen contained in the semiconductor film (FIG. 14A).

Figure 14B:
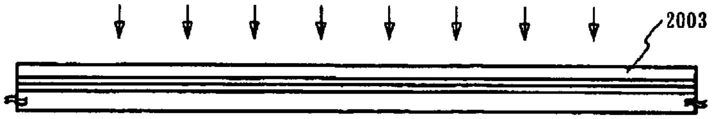

After that, the second harmonic (wavelength 532 nm, 5.5 W) of the continuous oscillating $YVO_4$ laser is used as the laser light to form an elliptical beam of 200 μm×50 μm having incident angle ϕ of about 20° of laser light with respect to the convex lens 1003 in the optical system shown in FIG. 10. The elliptical beam is irradiated on the semiconductor film 2002 by relatively being scanned at the speed of 50 cm/s (FIG. 14B).

Figure 14C:
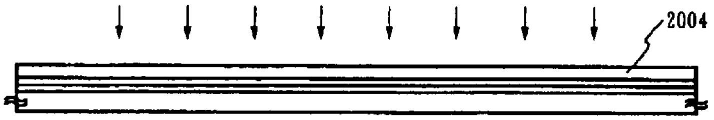

Then, first doping processing is performed thereon. This is channel doping for controlling the threshold value. $B_2H_6$ is used as material gas having a gas flow amount of 30 sccm, a current density of 0.05 μA, an accelerating voltage of 60 keV, and a dosage of $1\times10^{14}/cm^2$ (FIG. 14C).

Figure 14D:
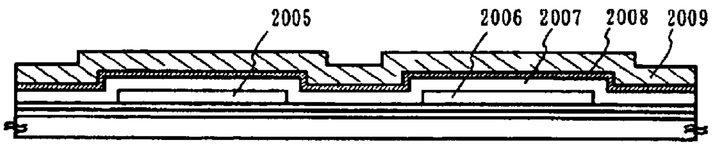

Next, after etching the semiconductor film 2004 into a desired form by patterning, a silicon oxynitride film in 115 nm thick is formed by plasma CVD method as a gate insulating film 2007 covering the etched semiconductor film. Then, a TaN film 2008 in 30 nm thick and a W film 2009 in 370 nm thick are stacked on the gate insulating film 2007 as a conductive film (FIG. 14D).

A mask (not shown) made of resist is formed thereon by using photolithography method, and the W film, the TaN film and the gate insulating film are etched.

Figure 14E:
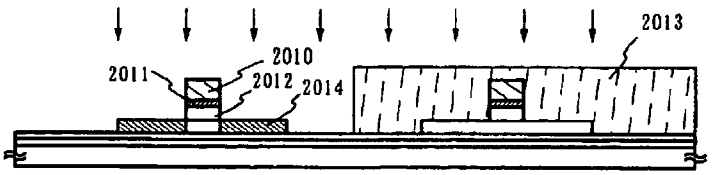

Then, the mask made of resist is removed, and a new mask 2013 is formed. The second doping processing is performed thereon and an impurity element imparting the n-type to the semiconductor film is introduced. In this case, the conductive layers 2010 and 2011 are masks for the impurity element imparting the n-type, and an impurity region 2014 is formed in a self-aligned manner. In this embodiment, the second doping processing is performed under two conditions because the semiconductor film is thick as much as 150 nm. In this embodiment, phosfin ($PH_3$) is used as material gas. The dosage of $2\times10^{13}/cm^2$ and the accelerating voltage of 90 keV are used, and then the dosage of $5\times10^{14}/cm^2$ and the accelerating voltage of 10 keV are used for the processing (FIG. 14E).

Figure 14F:
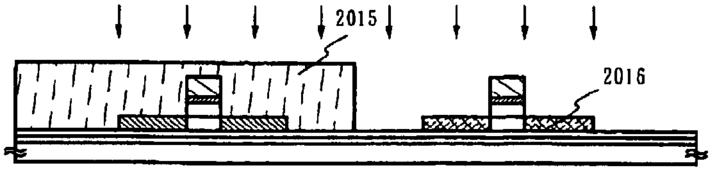

Next, the mask 2013 made of resist is removed, and a new mask 2015 made of resist is formed additionally for performing the third doping processing. Through the third doping processing, an impurity region 2016 is formed containing an impurity element for imparting the opposite conductive type against the one conductive type to the semiconductor film, which is an active layer of a p-channel TFT. By using the conductive layers 2010 and 2011 as a mask for the impurity element, the impurity region 2016 is formed in the self-aligned manner by addition of the impurity element for imparting the p-type. Also the third doping processing in this embodiment is performed under two conditions because the semiconductor film is thick as much as 150 nm. In this embodiment, diborane ($B_2H_6$) is used as material gas. The dosage of $2\times10^{13}/cm^2$ and the accelerating voltage of 90 keV are used, and then the dose amount of $1\times10^{15}/cm^2$ and the accelerating voltage of 10 keV are used for the processing (FIG. 14F).

Through these steps, the impurity regions 2014 and 2016 are formed on the respective semiconductor layers.

Next, the mask 2015 made of resist is removed, and silicon oxynitride film (composition ratio Si=32.8%, O=63.7%, and N=3.5%) in 50 nm thick is formed as a first interlayer insulating film 2017 by plasma CVD method.

Figure 14G:
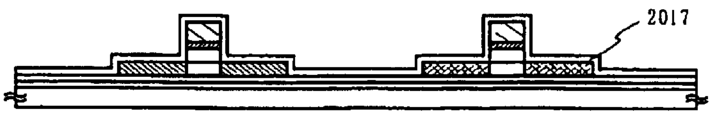

Next, thermal processing is performed thereon to recover crystallinity of the semiconductor layers and to activate the impurity elements added to the semiconductor layers, respectively. Then, thermal processing by thermal annealing method using an anneal furnace is performed at 550° C. for four hours in a nitrogen atmosphere (FIG. 14G).

Next, a second interlayer insulating film 2018 of an inorganic or organic insulating material is formed on the first interlayer insulating film 2017. In this embodiment, after forming a silicon nitride film in 50 nm thick by CVD method, a silicon oxide film in 400 nm thick is formed.

After the thermal processing, hydrogenation processing can be performed. In this embodiment, the thermal processing is performed at 410° C. for one hour in a nitrogen atmosphere by using an anneal furnace.

Figure 14H:
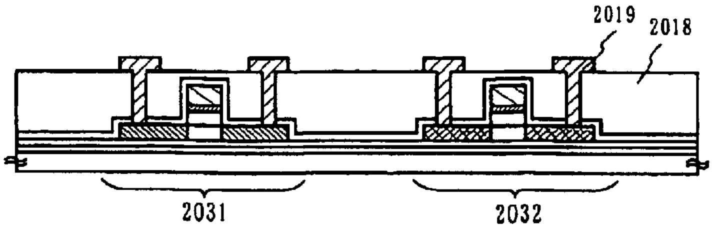

Next, a wiring 2019 is formed for connecting to the impurity regions electrically. In this embodiment, the wiring 2019 is formed by patterning a laminate film of a Ti film in 50 nm thick, an Al—Si film in 500 nm thick and a Ti film in 50 nm thick. Naturally, the construction is not limited to the two-layer construction, but may be a single layer construction or a laminate construction having three or more layers. The material of the wiring is not limited to Al and Ti. For example, Al and/or Cu may be formed on a TaN film. Then, a laminate film having a Ti film may be patterned to form a wiring (FIG. 14H).

In this way, the n-channel TFT 2031 and the p-channel TFT 2032 are formed, both having the channel length of 6 μm and the channel width of 4 μm.

Figure 15A:
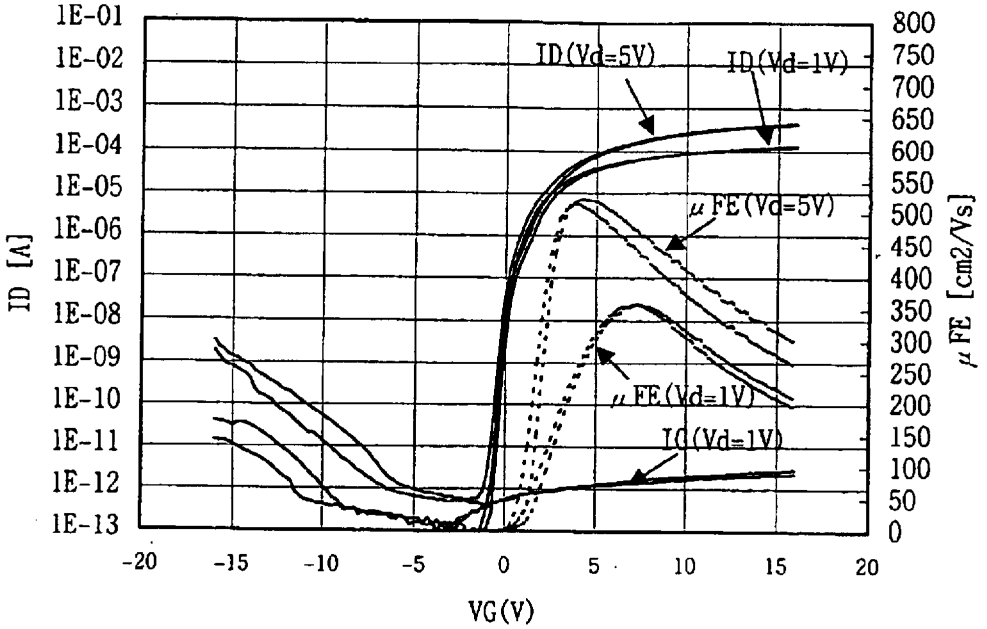
FIGS. 15A and 15B show electrical characteristics of the TFTs in accordance with Embodiment 8.
Figure 15B:
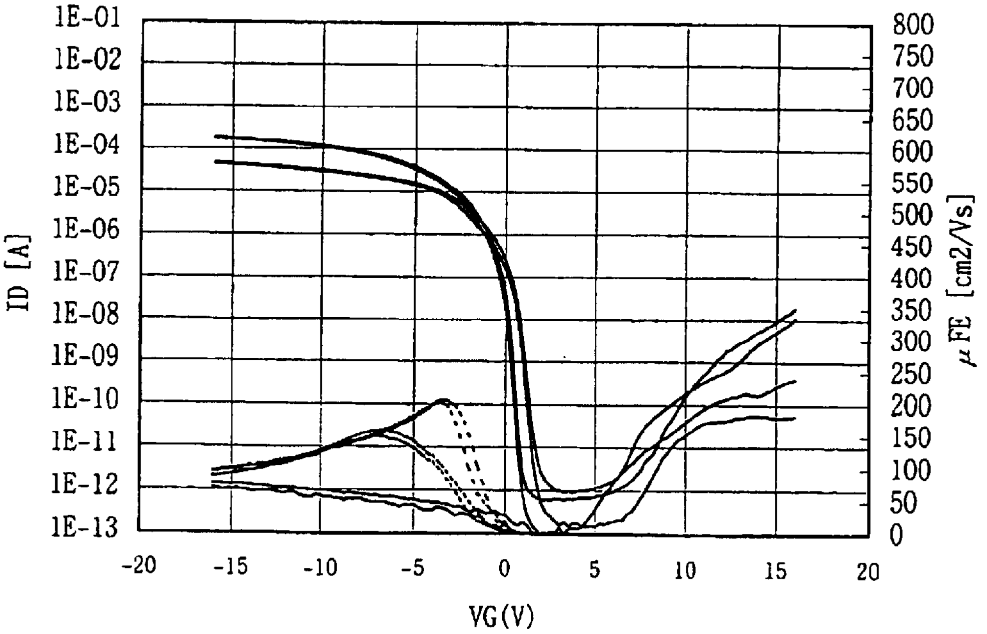

FIGS. 15A and 15B show results of measuring these electrical characteristics. FIG. 15A shows an electric characteristic of the n-channel TFT 2031. FIG. 15B shows an electric characteristic of the p-channel TFT 2032. The electric characteristics are measured at two measurement points in a range of gate voltage Vg=−16 to 16 V and in the range of drain voltage Vd=1 V and 5 V. In FIGS. 15A and 15B, the drain current (ID) and the gate current (IG) are indicated by solid lines. The mobility (μFE) is indicated by a dotted line.

Because large crystal grains are formed on the semiconductor film crystallized according to the present invention, the number of crystal grain boundaries containing the channel forming region can be reduced when a TFT is manufactured by using the semiconductor film. Furthermore, because the formed crystal grains direct to the same direction, the number of times of crossing the crystal grain boundaries by carriers can be extremely reduced. Therefore, a TFT having the good electric characteristic can be obtained as shown in FIGS. 15A and 15B. Especially, the mobility is 524 $cm^2/Vs$ in the n-channel TFT and 205 $cm^2/Vs$ in the p-channel TFT. When a display device is manufactured by using this type of TFT, the operational characteristic and the reliability can be improved also.

Embodiment 9

In this embodiment, a case where a TFT is manufactured by using a semiconductor film crystallized by using the method described in Embodiment 7 will be described with reference to FIG. 10 and FIGS. 16A to 19B.

Figure 16A:
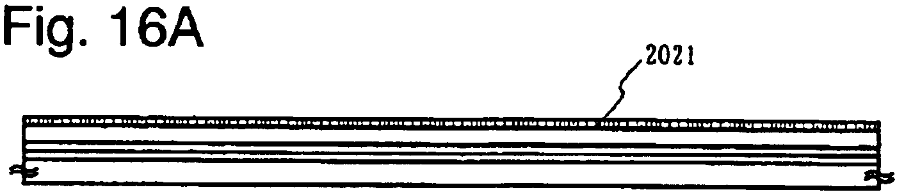
FIGS. 16A to 16C are sectional views showing a manufacturing process of TFTs in accordance with Embodiment 9.

The steps up to forming the amorphous silicon film as the semiconductor film are the same as Embodiment 8. The amorphous silicon film is formed in 150 nm thick (FIG. 16A).

Figure 16B:
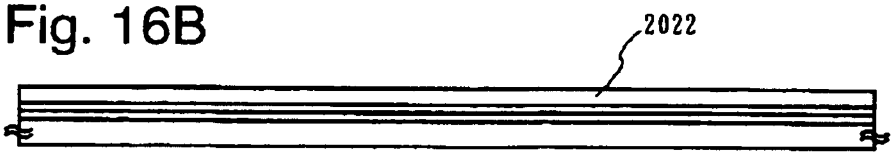

After that, the method disclosed in the Japanese Patent Application Laid-Open No. Hei 7-183540 is used. Nickel acetate solution (5 ppm in weight conversion concentration and 10 ml in volume) is coated on the semiconductor film by spin coating method to form a metal containing layer 2021. Then, thermal processing is performed thereon in a nitrogen atmosphere at 500° C. for one hour and in a nitrogen atmosphere at 550° C. for twelve hours. Then, a semiconductor film 2022 is obtained (FIG. 16B).

Then, the crystallinity of the semiconductor film 2022 is improved by laser annealing method.

As the laser used for laser annealing method, continuous oscillating $YVO_4$ laser is used. For the condition for the laser annealing method, the second harmonic (wavelength 532 nm, 5.5 W) of the $YVO_4$ laser is used as laser light. The elliptical beam of 200 μm×50 μm is formed having incident angle $\phi$ of about 20° of laser light with respect to the convex lens 1003 in the optical system shown in FIG. 10. The elliptical beam is moved and irradiated to the substrate at the speed of 20 cm/s or 50 cm/s. Thus, the crystallinity of the semiconductor film 2022 is improved. As a result, a semiconductor film 2023 is obtained (FIG. 16C).

Figure 16C:
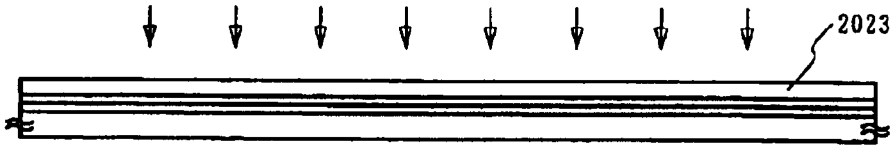

The steps after the crystallizing the semiconductor film in FIG. 16C are the same as the steps shown in FIGS. 14C to 14H shown in Embodiment 8. In this way, the n-channel TFT 2031 and the p-channel TFT 2032 are formed, both having the channel length of 6 μm and the channel width of 4 μm. These electrical characteristics are measured.

FIGS. 17A to 19B show electric characteristics of the TFT manufactured through these steps.

Figure 17A:
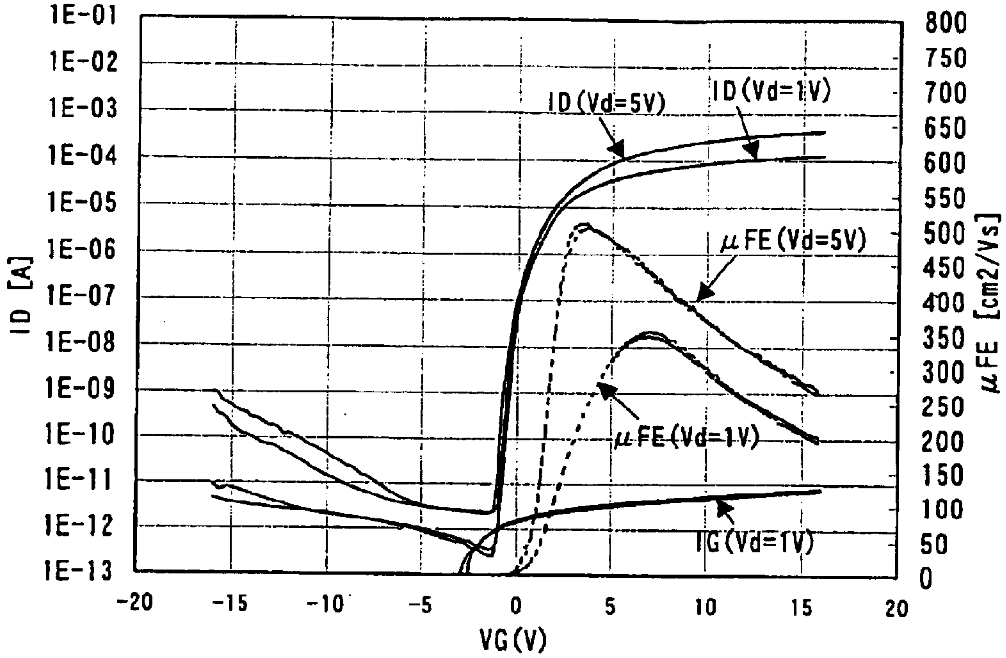
FIGS. 17A and 17B show electrical characteristics of the TFTs in accordance with Embodiment 9.
Figure 17B:
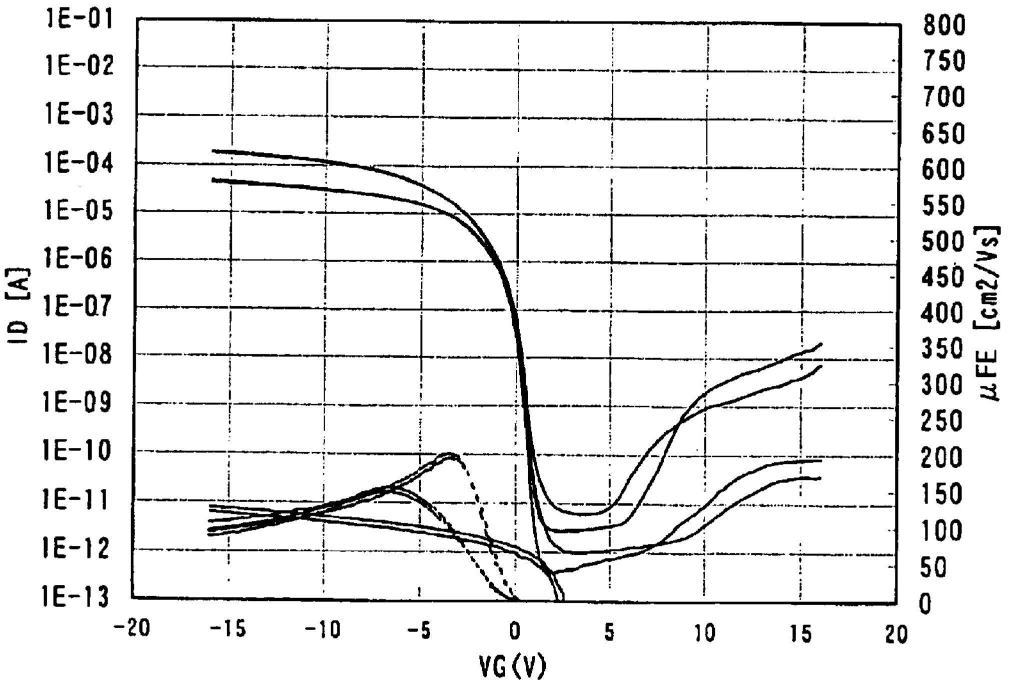
Figure 18A:
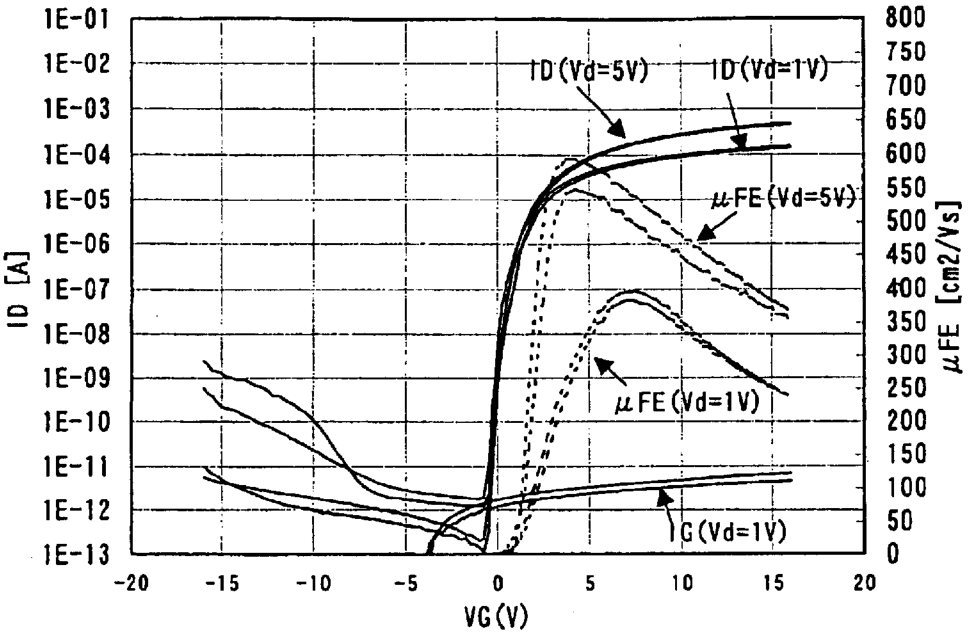
FIGS. 18A and 18B show electrical characteristics of the TFTs in accordance with Embodiment 9.
Figure 18B:
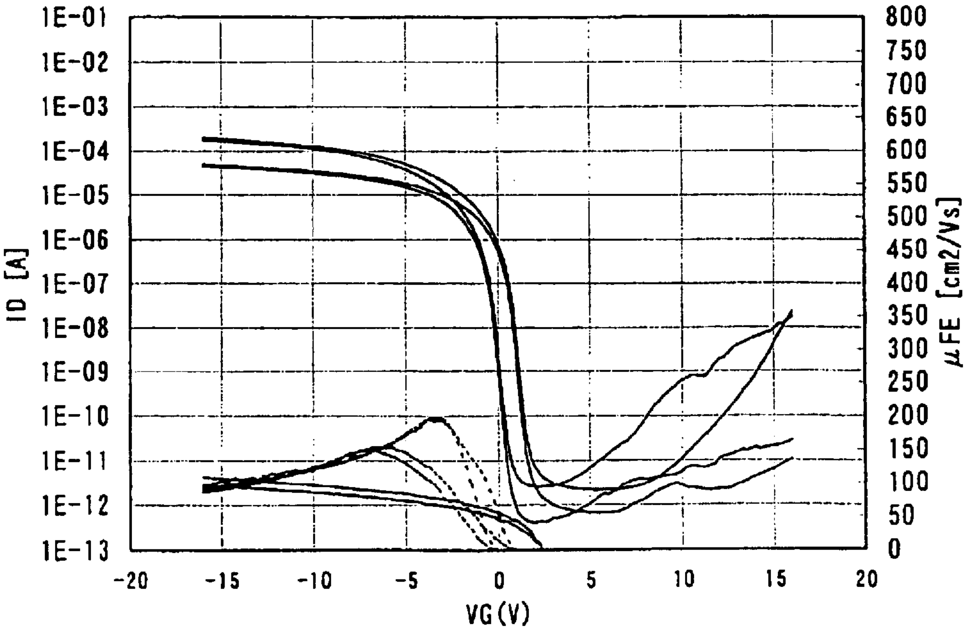

FIGS. 17A and 17B show these electrical characteristics of a TFT manufactured by moving the substrate at the speed of 20 cm/s in the laser annealing step in FIG. 16C. FIG. 17A shows an electric characteristic of the n-channel TFT 2031. FIG. 17B shows an electric characteristic of the p-channel TFT 2032. FIGS. 18A and 18B show these electrical characteristics of a TFT manufactured by moving the substrate at the speed of 50 cm/s in the laser annealing step in FIG. 16C. FIG. 18A shows an electric characteristic of the n-channel TFT 2031. FIG. 18B shows an electric characteristic of the p-channel TFT 2032.

The electric characteristics are measured in a range of gate voltage Vg=−16 to 16 V and in the range of drain voltage Vd=1 V and 5 V. In FIGS. 17A to 18B, the drain current (ID) and the gate current (IG) are indicated by solid lines. The mobility (μFE) is indicated by a dotted line.

Because large crystal grains are formed on the semiconductor film crystallized according to the present invention, the number of crystal grain boundaries contained in the channel forming region can be reduced when a TFT is manufactured by using the semiconductor film. Furthermore, the formed crystal grains direct to the same direction. In addition, the small number of grain boundaries is laid in a direction crossing the relative scanning direction of laser light. Therefore, the number of times of crossing the crystal grain boundaries by carriers can be extremely reduced.

Accordingly, a TFT having the good electric characteristic can be obtained as shown in FIGS. 17A to 18B. Especially, the mobility is 510 $cm^2/Vs$ in the n-channel TFT and 200 $cm^2/Vs$ in the p-channel TFT in FIGS. 17A and 17B. The mobility is 595 $cm^2/Vs$ in the n-channel TFT and 199 $cm^2/Vs$ in the p-channel TFT in FIGS. 18A and 18B. When a semiconductor apparatus is manufactured by using this type of TFT, the operational characteristic and the reliability can be also improved.

Figure 19A:
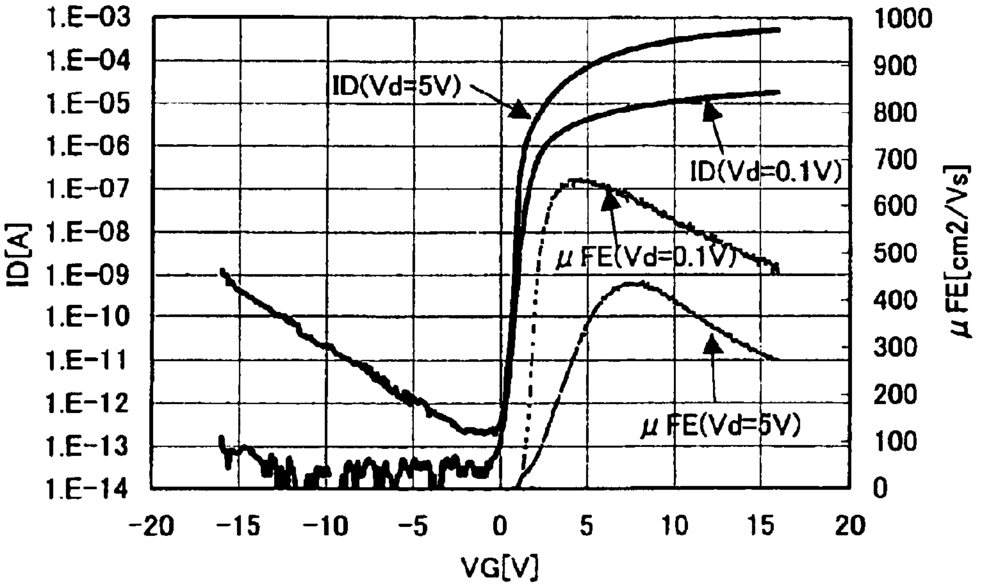
FIGS. 19A and 19B show electrical characteristics of the TFTs in accordance with Embodiment 9.
Figure 19B:
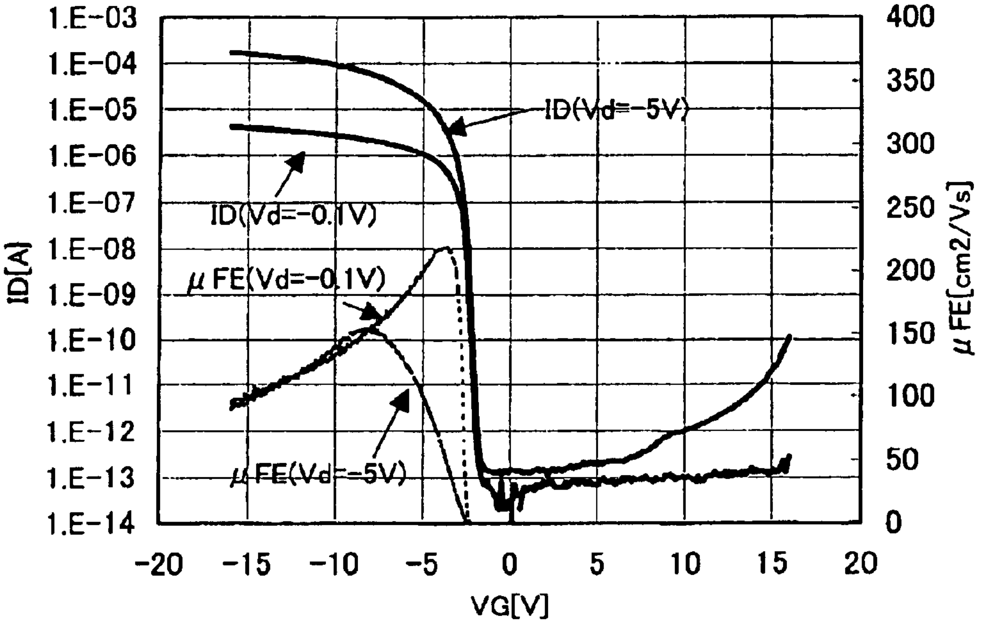

FIGS. 19A and 19B show these electrical characteristics of a TFT manufactured by moving the substrate at the speed of 50 cm/s in the laser annealing step in FIG. 16C. FIG. 19A shows an electric characteristic of the n-channel TFT 2031. FIG. 19B shows an electric characteristic of the p-channel TFT 2032.

The electric characteristics are measured in a range of gate voltage Vg=−16 to 16 V and in the range of drain voltage Vd=0.1 V and 5 V.

As shown in FIGS. 19A and 19B, a TFT having the good electric characteristic can be obtained. Especially, the mobility is 657 $cm^2/Vs$ in the n-channel TFT in FIG. 19A and 219 $cm^2/Vs$ in the p-channel TFT in FIG. 19B. When a semiconductor apparatus is manufactured by using this type of TFT, the operational characteristic and the reliability can be also improved.

Embodiment 10

A non-volatile memory according to the present invention can be incorporated into electronic devices in all the fields as a recording medium for conducting storage and read of data. In this embodiment, such electronic devices are explained.

Examples of electronic devices to which the present invention is applied include a video camera, a digital camera, a goggle type display (head-mounted display), a navigation system, a sound reproducing system (car audio system, audio component stereo, or the like), a notebook personal computer, a game player, a portable information terminal (mobile computer, portable telephone, portable game player, electronic book, or the like), and an image reproducing system provided with a recording medium (specifically, device which plays a recording medium such as a digital versatile disc (DVD) and is provided with a display for displaying images). Specific examples of the electronic devices are shown in FIGS. 20A to 20G.

Figure 20A:
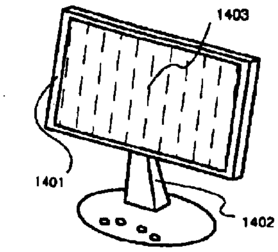
FIGS. 20A to 20G show electronic devices in accordance with Embodiment 10.

FIG. 20A shows a display device, which includes a casing 1401, a support stand 1402, and a display portion 1403. The present invention can be applied to the display portion 1403.

Figure 20B:
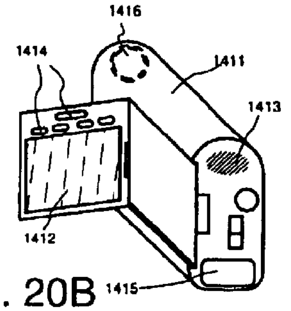

FIG. 20B shows a video camera, which is constituted by a main body 1411, a display portion 1412, a sound input portion 1413, operation switches 1414, a battery 1415, an image receiving portion 1416, and the like. The present invention can be applied to the display portion 1412.

Figure 20C:
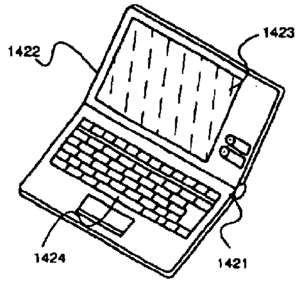

FIG. 20C shows a notebook personal computer, which is constituted by a main body 1421, a casing 1422, a display portion 1423, a keyboard 1424, and the like. The present invention can be applied to the display portion 1423.

Figure 20D:
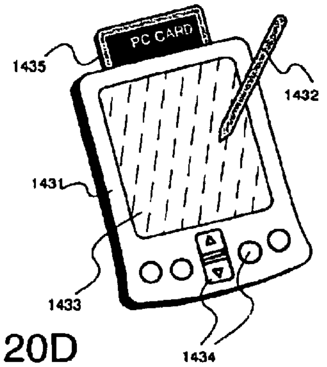

FIG. 20D shows a portable information terminal, which is constituted by a main body 1431, a stylus 1432, a display portion 1433, operation buttons 1434, an external interface 1435, and the like. The present invention can be applied to the display portion 1433.

Figure 20E:
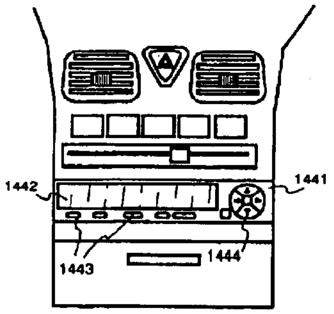

FIG. 20E shows a sound reproducing system, specifically, an audio system for an automobile, which is constituted by a main body 1441, a display portion 1442, operation switches 1443 and 1444, and the like. The present invention can be applied to the display portion 1442. Further, the audio system for an automobile is taken as an example here, but a portable or domestic audio system may be given.

Figure 20F:
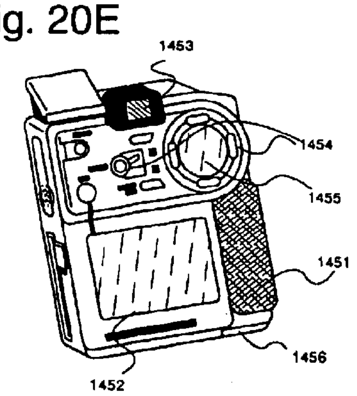

FIG. 20F shows a digital camera, which is constituted by a main body 1451, a display portion A 1452, an eyepiece portion 1453, operation switches 1454, a display portion B 1455, a battery 1456, and the like. The present invention can be applied to the display portion A 1452 and the display portion B 1455.

Figure 20G:
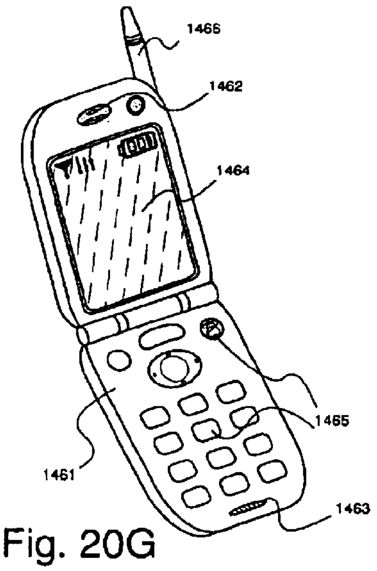

FIG. 20G shows a portable telephone, which is constituted by a main body 1461, a sound output portion 1462, a sound input portion 1463, a display portion 1464, operation switches 1465, an antenna 1466, and the like. The present invention can be applied to the display portion 1464.

Not only a glass substrate but also a heat-resistance plastic substrate can be used for the display device used in each of the above electronic devices. Thus, reduction in weight of the electronic device can be attained.

As described above, the application range of the present invention is extremely wide, and thus, the present invention can be applied to the electronic devices in all the fields. Further, the electronic device in this embodiment can be realized by using the structure based on any combination of Embodiments 1 to 9.

Thus, the display device and the display system using the same according to the present invention are used, whereby there can be realized the small and lightweight electronic device which enables a high-definition display with low power consumption.

According to the present invention, the part of operation processing, which has been conducted in the GPU in the prior art, can be conducted in the display device, and thus, the operation processing amount in the GPU can be reduced. Further, the number of parts necessary for the display system can be reduced, whereby the display system can be downsized and reduced in weight. Furthermore, in the case where a static image is displayed, or in the case where only part of the image data is changed, it is sufficient that the very minimum amount of image data is rewritten, and thus, the power consumption can be greatly reduced. Accordingly, the display device appropriate for the high-definition and large-size image display and the display system using the display device can be realized.

The present invention can be applied to other types of display devices in addition to those described in the preferred embodiments of the present invention. For example, an active matrix display device based on a silicon chip may used. Also, the thin film transistor may be a top-gate type, a bottom-gate type, or a dual-gate type.

What is claimed is:

1. A display device comprising:

a plurality of pixels, each pixel comprising:

a first storage circuit;

a second storage circuit;

an operation processing circuit; and a display processing circuit, wherein: the first storage circuit stores first image data and outputs the first image data to the operation processing circuit; the second storage circuit stores second image data and outputs the second image data to the operation processing circuit; the operation processing circuit outputs the first image data to the display processing circuit when the second image data corresponds to predetermined image data, and outputs the second image data to the display processing circuit when the second image data does not correspond to the predetermined image data; and the display processing circuit forms an image signal from the first image data or the second image data which is output from the operation processing circuit.

2. A display device according to claim 1, wherein at least one of the first image data and the second image data is image data of 1 bit.

3. A display device according to claim 1, wherein at least one of the first image data and the second image data is image data of 2 bits or more.

4. A display device according to claim 1, further comprising means for changing a gradation of a pixel in accordance with the image signal.

5. A display device according to claim 1, further comprising means for sequentially driving the storage circuits for each bit.

6. A display device according to claim 1, further comprising means for sequentially inputting the image data to the storage circuits for each bit.

7. A display device according to claim 1, wherein the storage circuits each are comprised of a static random access memory (SRAM).

8. A display device according to claim 1, wherein the storage circuits each are comprised of a dynamic random access memory (DRAM).

9. A display device according to claim 1, wherein the storage circuits, the operation processing circuit, and the display processing circuit are structured by thin film transistors, each including an active layer formed of a semiconductor thin film, which are formed on one substrate selected from the group consisting of a single crystalline semiconductor substrate, a quartz substrate, a glass substrate, a plastic substrate, a stainless substrate, and an SOI substrate.

10. A display device according to claim 1, wherein a circuit having a function of sequentially driving the storage circuits for each bit is formed on the same substrate as a pixel portion.

11. A display device according to claim 1, wherein a circuit having a function of sequentially inputting the image data to the storage circuits for each bit is formed on the same substrate as the pixel portion.

12. A display device according to claim 1, wherein the semiconductor thin film is formed by a crystallization method using a continuous oscillation laser.

13. A display device according to claim 1, wherein the display device is applied to an electronic device selected from the group consisting of a display, a video camera, a head mount type display, a DVD reproduction apparatus, a goggle type display, a personal computer, a mobile telephone and a sound reproduction apparatus.

14. A display system, which is constituted by the display device according to claim 1 and an operation processing device dedicated for image processing.

15. An electronic device, which uses the display system according to claim 14.

16. A display device comprising:

a plurality of pixels, each pixel comprising:

a first storage circuit, a second storage circuit;

an operation processing circuit; and a display processing circuit, wherein: the first storage circuit stores first image data and outputs the first image data to the operation processing circuit; the second storage circuit stores second image data and outputs the second image data to the operation processing circuit; the operation processing circuit outputs the first image data to the display processing circuit in the ease where when the second image data corresponds to predetermined image data, and outputs the second image data to the display processing circuit when the second image data does not correspond to the predetermined image data; the display processing circuit forms an image signal from the first image data or the second image data which is output from the operation processing circuit; the first storage circuit has means for storing the first image data corresponding to one frame; and the second storage circuit has means for storing the second image data corresponding to one frame.

17. A display device according to claim 16, wherein at least one of the first image data and the second image data is image data of 1 bit.

18. A display device according to claim 16, wherein at least one of the first image data and the second image data is image data of 2 bits or more.

19. A display device according to claim 16, further comprising means for changing a gradation of a pixel in accordance with the image signal.

20. A display device according to claim 16, further comprising means for sequentially driving the storage circuits for each bit.

21. A display device according to claim 16, further comprising means for sequentially inputting the image data to the storage circuits for each bit.

22. A display device according to claim 16, wherein the storage circuits each are comprised of a static random access memory (SRAM).

23. A display device according to claim 16, wherein the storage circuits each are comprised of a dynamic random access memory (DRAM).

24. A display device according to claim 16, wherein the storage circuits, the operation processing circuit, and the display processing circuit are structured by thin film transistors, each including an active layer formed of a semiconductor thin film, which are formed on one substrate selected from the group consisting of a single crystalline semiconductor substrate, a quartz substrate, a glass substrate, a plastic substrate, a stainless substrate, and an SOI substrate.

25. A display device according to claim 16, wherein a circuit having a function of sequentially driving the storage circuits for each bit is formed on the same substrate as a pixel portion.

26. A display device according to claim 16, wherein a circuit having a function of sequentially inputting the image data to the storage circuits for each bit is formed on the same substrate as the pixel portion.

27. A display device according to claim 16, wherein the semiconductor thin film is formed by a crystallization method using a continuous oscillation laser.

28. A display device according to claim 16, wherein the display device is applied to an electronic device selected from the group consisting of a display, a video camera, a head mount type display, a DVD reproduction apparatus, a goggle type display, a personal computer, a mobile telephone and a sound reproduction apparatus.

29. A display system, which is constituted by the display device according to claim 16 and an operation processing device dedicated for image processing.

30. An electronic device, which uses the display system according to claim 29.

31. A display device comprising:

a plurality of pixels, each pixel comprising:

a first storage circuit;

a second storage circuit;

an operation processing circuit; and a display processing circuit, wherein: the first storage circuit stores first image data and outputs the first image data to the operation processing circuit; the second storage circuit stores second image data and output the second image data to the operation processing circuit; the operation processing circuit outputs the first image data to the display processing circuit when the second image data corresponds to predetermined image data, and outputs the second image data to the display processing circuit when the second image data does not correspond to the predetermined image data; and the display processing circuit forms an image signal from the first image data or the second image data, which is output from the operation processing circuit, through D/A conversion.

32. A display device according to claim 31, wherein at least one of the first image data and the second image data is image data of 1 bit.

33. A display device according to claim 31, wherein at least one of the first image data and the second image data is image data of 2 bits or more.

34. A display device according to claim 31, further comprising means for changing a gradation of a pixel in accordance with the image signal.

35. A display device according to claim 31, further comprising means for sequentially driving the storage circuits for each bit.

36. A display device according to claim 31, further comprising means for sequentially inputting the image data to the storage circuits for each bit.

37. A display device according to claim 31, wherein the storage circuits each are comprised of a static random access memory (SRAM).

38. A display device according to claim 31, wherein the storage circuits each are comprised of a dynamic random access memory (DRAM).

39. A display device according to claim 31, wherein the storage circuits, the operation processing circuit, and the display processing circuit are structured by thin film transistors, each including an active layer formed of a semiconductor thin film, which are formed on one substrate selected from the group consisting of a single crystalline semiconductor substrate, a quartz substrate, a glass substrate, a plastic substrate, a stainless substrate, and an SOI substrate.

40. A display device according to claim 31, wherein a circuit having a function of sequentially driving the storage circuits for each bit is formed on the same substrate as a pixel portion.

41. A display device according to claim 31, wherein a circuit having a function of sequentially inputting the image data to the storage circuits for each bit is formed on the same substrate as the pixel portion.

42. A display device according to claim 31, wherein the semiconductor thin film is formed by a crystallization method using a continuous oscillation laser.

43. A display device according to claim 31, wherein the display device is applied to an electronic device selected from the group consisting of a display, a video camera, a head mount type display, a DVD reproduction apparatus, a goggle type display, a personal computer, a mobile telephone and a sound reproduction apparatus.

44. A display system, which is constituted by the display device according to claim 31 and an operation processing device dedicated for image processing.

45. An electronic device, which uses the display system according to claim 44.

46. A display device comprising:

a plurality of pixels, each pixel comprising:

a first storage circuit;

a second storage circuit;

an operation processing circuit; and a display processing circuit, wherein: the first storage circuit stores first image data and outputs the first image data to the operation processing circuit; the second storage circuit stores second image data and outputs the second image data to the operation processing circuit; the operation processing circuit outputs the first image data to the display processing circuit when the second image data corresponds to predetermined image data, and outputs the second image data to the display processing circuit when the second image data does not correspond to the predetermined image data; the display processing circuit forms an image signal from the first image data or the second image data, which is output from the operation processing circuit, through D/A conversion; the first storage circuit has means for storing the first image data corresponding to one frame; and the second storage circuit has means for storing the second image data corresponding to one frame.

47. A display device according to claim 46, wherein at least one of the first image data and the second image data is image data of 1 bit.

48. A display device according to 46, wherein at least one of the first image data and the second image data is image data of 2 bits or more.

49. A display device according to claim 46, further comprising means for changing a gradation of a pixel in accordance with the image signal.

50. A display device according to claim 46, further comprising means for sequentially driving the storage circuits for each bit.

51. A display device according to claim 46, further comprising means for sequentially inputting the image data to the storage circuits for each bit.

52. A display device according to claim 46, wherein the storage circuits each are comprised of a static random access memory (SRAM).

53. A display device according to claim 46, wherein the storage circuits each are comprised of a dynamic random access memory (DRAM).

54. A display device according to claim 46, wherein the storage circuits, the operation processing circuit, and the display processing circuit are structured by thin film transistors, each including an active layer formed of a semiconductor thin film, which are formed on one substrate selected from the group consisting of a single crystalline semiconductor substrate, a quartz substrate, a glass substrate, a plastic substrate, a stainless substrate, and an SOI substrate.

55. A display device according to claim 46, wherein a circuit having a function of sequentially driving the storage circuits for each bit is formed on the same substrate as a pixel portion.

56. A display device according to claim 46, wherein a circuit having a function of sequentially inputting the image data to the storage circuits for each bit is formed on the same substrate as the pixel portion.

57. A display device according to claim 46, wherein the semiconductor thin film is formed by a crystallization method using a continuous oscillation laser.

58. A display device according to claim 46, wherein the display device is applied to an electronic device selected from the group consisting of a display, a video camera, a head mount type display, a DVD reproduction apparatus, a goggle type display, a personal computer, a mobile telephone and a sound reproduction apparatus.

59. A display system, which is constituted by the display device according to claim 46 and an operation processing device dedicated for image processing.

60. An electronic device, which uses the display system according to claim 59.

* * * * *